(12) United States Patent
Simon et al.

(10) Patent No.: US 11,049,290 B2
(45) Date of Patent: Jun. 29, 2021

(54) GENERATION OF A SEQUENCE OF TEXTURES FOR VIDEO DELIVERY

(71) Applicant: Adobe Inc., San Jose, CA (US)

(72) Inventors: Gwendal Simon, San Carlos, CA (US); Viswanathan Swaminathan, Saratoga, CA (US); Nathan Carr, San Jose, CA (US); Stefano Petrangeli, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/584,591

(22) Filed: Sep. 26, 2019

(65) Prior Publication Data

US 2020/0302658 A1   Sep. 24, 2020

Related U.S. Application Data

(60) Provisional application No. 62/821,958, filed on Mar. 21, 2019.

(51) Int. Cl.
*G06T 11/00* (2006.01)
*G06T 3/40* (2006.01)
*H04N 19/176* (2014.01)
*H04N 19/182* (2014.01)

(52) U.S. Cl.
CPC .......... *G06T 11/001* (2013.01); *G06T 3/4038* (2013.01); *H04N 19/176* (2014.11); *H04N 19/182* (2014.11)

(58) Field of Classification Search
None
See application file for complete search history.

(56) References Cited

U.S. PATENT DOCUMENTS

| 2008/0159639 | A1* | 7/2008 | Dvir | H04N 19/119 382/236 |
| 2010/0214291 | A1* | 8/2010 | Muller | G06T 17/10 345/420 |
| 2012/0268465 | A1* | 10/2012 | Inada | G11B 27/329 345/428 |

* cited by examiner

*Primary Examiner* — Tize Ma
(74) *Attorney, Agent, or Firm* — Nicholson De Vos Webster & Elliott LLP

(57) ABSTRACT

Techniques and systems are provided for generating a video from texture images, and for reconstructing the texture images from the video. For example, a texture image can be divided into a number of tiles, and the number of tiles can be sorted into a sequence of ordered tiles. The sequence of ordered tiles can be provided to a video coder for generating a coded video. The number of tiles can be encoded based on the sequence of ordered tiles. The encoded video including the encoded sequence of ordered tiles can be decoded. At least a portion of the decoded video can include the number of tiles sorted into a sequence of ordered tiles. A data file associated with at least the portion of the decoded video can be used to reconstruct the texture image using the tiles.

20 Claims, 16 Drawing Sheets

100

300

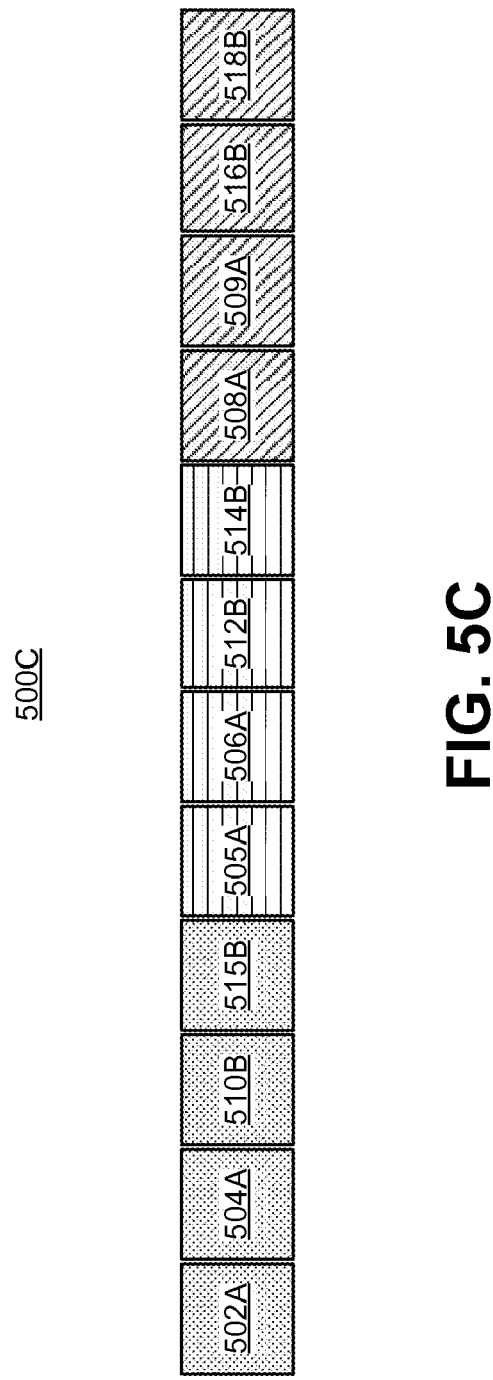

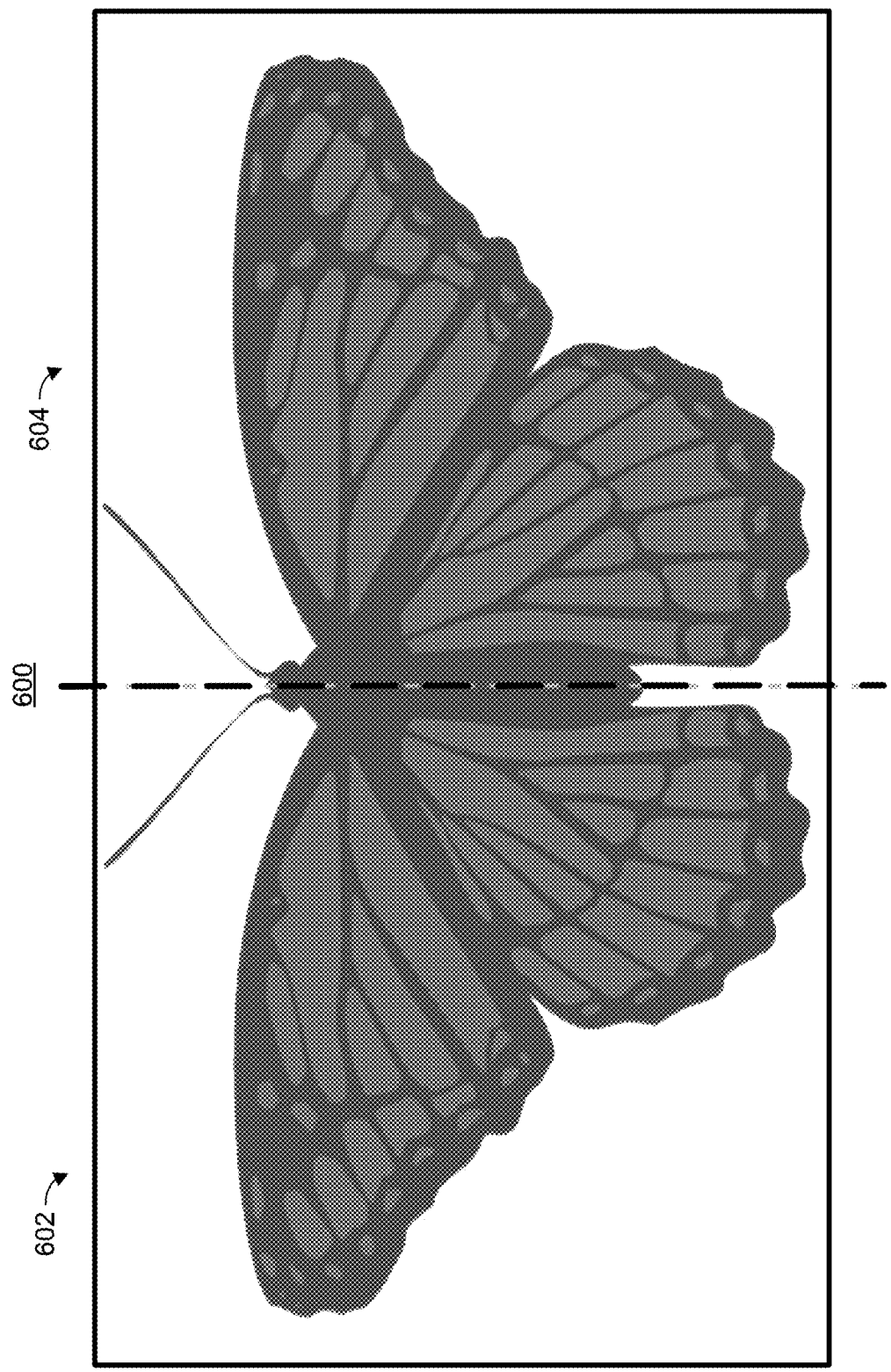

900

```
┌─────────────────────────────────────────────────────────┐
│ DIVIDE A FIRST TEXTURE IMAGE INTO A FIRST PLURALITY OF  │
│ TILES, THE FIRST TEXTURE IMAGE BEING CONFIGURED FOR     │
│ APPLICATION TO AT LEAST A FIRST THREE-DIMENSIONAL MESH  │
│                          902                            │
└─────────────────────────────────────────────────────────┘
                              │
                              ▼
┌─────────────────────────────────────────────────────────┐
│   SORT THE FIRST PLURALITY OF TILES INTO A SEQUENCE OF  │
│                      ORDERED TILES                      │
│                          904                            │
└─────────────────────────────────────────────────────────┘
                              │
                              ▼
┌─────────────────────────────────────────────────────────┐
│ PROVIDE THE SEQUENCE OF ORDERED TILES FOR GENERATION    │
│  OF A CODED VIDEO, WHEREIN GENERATION OF THE CODED      │
│  VIDEO INCLUDES ENCODING THE FIRST PLURALITY OF TILES   │
│         BASED ON THE SEQUENCE OF ORDERED TILES          │
│                          906                            │
└─────────────────────────────────────────────────────────┘
```

OBTAIN AT LEAST A PORTION OF DECODED VIDEO INCLUDING A FIRST PLURALITY OF TILES SORTED INTO A SEQUENCE OF ORDERED TILES, THE FIRST PLURALITY OF TILES BEING ASSOCIATED WITH A FIRST TEXTURE IMAGE CONFIGURED FOR APPLICATION TO A FIRST THREE-DIMENSIONAL MESH
1002

OBTAIN A DATA FILE ASSOCIATED WITH AT LEAST THE PORTION OF THE DECODED VIDEO, THE DATA FILE INCLUDING CONTEXTUAL DATA MAPPING THE FIRST PLURALITY OF TILES TO THE FIRST TEXTURE IMAGE
1004

RECONSTRUCT THE FIRST TEXTURE IMAGE BASED ON THE CONTEXTUAL DATA MAPPING THE FIRST PLURALITY OF TILES TO THE FIRST TEXTURE IMAGE
1006

FIG. 10

GENERATION OF A SEQUENCE OF TEXTURES FOR VIDEO DELIVERY

CROSS REFERENCE TO RELATED APPLICATIONS

This application claims the benefit of U.S. provisional application No. 62/821,958, filed on Mar. 21, 2019, which is hereby incorporated by reference, in its entirety and for all purposes.

FIELD

This application is related to processing of texture images. For example, aspects of this application relate to generating and streaming a sequence of texture images in a video.

BACKGROUND

Digital media content includes large amounts of data to meet the demands of consumers, video providers, among others. For instance, many users desire high quality video with large resolutions, frame rates, and the like. The large amount of data required to meet these demands places a burden on communication networks, as well as the devices that process and store the video data.

Three-dimensional (3D) media content includes an even larger amount of data than two-dimensional (2D) media. For example, a 3D scene can include numerous 3D objects, and each object can be associated with a vast amount of data needed to define the geometry and properties of the object. Delivering rich, high quality 3D scenes over a network (e.g., the Internet) is challenging due to the size of the various 3D objects in a 3D scene.

SUMMARY

In some examples, techniques and systems are described herein for generating and processing texture images so that the texture images can be efficiently and adaptively delivered for consumption. For example, a 3D scene can be made up of various objects (e.g., thousands or more objects in some cases), resulting in a massive amount of data when uncompressed. Delivery of the uncompressed data from one system (e.g., a content provider) to another system (e.g., an end user device) can be difficult based on network and device constraints.

The large amount of data is due, at least in part, to each object in a 3D virtual world being defined by a 3D mesh and high resolution texture data. The 3D mesh of an object can define a part of or the entire geometry of the object, while the texture data can define different properties of the object. The texture data associated with an object can include one or more texture images (also referred to herein as "textures"). In some cases, a single object can have multiple texture images that define different properties of the object. A texture image can be applied to the 3D mesh of an object in order to modify the surface properties of the object. In one illustrative example, a first texture image can include values defining the colors of the surface of the object, a second texture image can include values defining how shiny or rough to make certain regions of the surface of the object, and a third texture image can include values defining a surface normal of various points on the surface (e.g., used for modifying the surface properties of the object). Many other examples of texture images are available for defining properties of an object.

The techniques and systems described herein allow texture images to be encoded and delivered as a video sequence, rather than being delivered independently as individual texture images or as individual encoded texture images. The texture images can be processed so that existing content delivery infrastructures can be used, providing fine-grained control of the quality of the resulting video sequence. For example, one or more texture images can be divided into overlapping or non-overlapping tiles. In some cases, the tiles can have a uniform tile size. For instance, the tiles of one texture image or the tiles of multiple texture images having different resolutions can all have the same uniform tile size. The uniform tile size allows the tiles to be encoded by a video encoder as if they were video frames having a certain video resolution.

A sequence of ordered tiles can then be generated by sorting the tiles into a particular order. In one illustrative example, a similarity-based ordering can be performed, where an order of the tiles in the sequence can be determined based on similarities among the tiles of the one or more texture images. The sequence of ordered tiles can be in an order that intersperses the tiles of different texture images. The similarity-based ordering can result in consecutive images in the sequence having high similarity, allowing a video encoder to exploit this similarity and more efficiently compress the video. In another illustrative example, a sub-sequence based ordering can be performed. The sub-sequence based ordering can sort the tiles with respect to segments of video having a certain number of seconds, resulting in the sequence of ordered tiles including a number of sub-sequences. For example, the tiles can be sorted into the sequence of ordered tiles in an order that minimizes a number of video segments needed to be downloaded to obtain the first texture image. In some cases, the sub-sequence based ordering can ensure that most or all of the tiles of a given texture image are in a minimum number of segments. In some examples, the tiles of a texture image can be ordered in raster scan order, can be randomly ordered, or can be ordered based on the similarity-based ordering. Other techniques for ordering the tiles can be performed in addition to or as an alternative to the similarity-based ordering and the sub-sequence based ordering.

The sequence of ordered tiles can be provided as input frames to a video encoder. The video encoder treats the tiles in the sequence of ordered tiles as individual image frames. The video encoder produces an encoded texture video including encoded tiles from the sequence of ordered tiles and other information. The encoded tiles can also be referred to herein as encoded pictures. Various input parameters can also be provided to the video encoder, such as a number of frames per second (FPS), a target video bit-rate, a number of independently decodable and downloadable segments to include in the video, any combination thereof, and/or other parameters. Unlike standard video that includes frames having a temporal relationship (e.g., frames of a video are output or played in a certain order), the texture images and the individual tiles of the texture images do not have any temporal or time-based relationship (referred to herein as being "temporally independent"). Such temporal independency among the texture images and the tiles allows any FPS value to be chosen. In some cases, the FPS and bit-rate parameters allow a service provider to generate multiple versions of the same video (having the set of textures) with multiple qualities and multiple delivery delays. In some cases, a data file can be provided with the encoded video, which can be used by a decoder to reconstruct the texture images.

The encoded video (including the encoded tiles) can be delivered to a video decoder over a network using an existing video delivery infrastructure. For example, the encoded video can be streamed over the Internet using an Internet streaming protocol. The video decoder can decode the video to obtain the decoded sequence of ordered tiles, and can send the decoded sequence to a texture image reconstruction system. The texture image reconstruction system can obtain the data file provided with the encoded video, and can reconstruct the texture images using information from the data file. For example, the data file can include contextual data for the tiles making up the sequence of ordered tiles. For a given tile, the contextual data can include a tile identifier for the tile, an identification of a texture image associated with the tile, and a location of the first tile within the texture image. In some examples, transform information can also be included for a tile in the data file. As described in more detail herein, the transform information can indicate a transform that is to be applied to a tile to modify pixels of the tile to generate the final texture image.

According to at least one example, a method of generating a video from one or more texture images is provided. The method comprises dividing a first texture image into a first plurality of tiles. The first texture image is configured for application to at least a first three-dimensional mesh. The method further comprises sorting the first plurality of tiles into a sequence of ordered tiles, and providing the sequence of ordered tiles for generation of a coded video. Generation of the coded video includes encoding the first plurality of tiles based on the sequence of ordered tiles.

In another example, an apparatus for generating a video from one or more texture images is provided that includes a memory configured to store the one or more texture images and a processor coupled to the memory. The processor is configured to divide a first texture image into a first plurality of tiles. The first texture image is configured for application to at least a first three-dimensional mesh. The processor is further configured to sort the first plurality of tiles into a sequence of ordered tiles. The processor is further configured to provide the sequence of ordered tiles for generation of a coded video. Generation of the coded video includes encoding the first plurality of tiles based on the sequence of ordered tiles.

In another example, a non-transitory computer-readable medium is provided having stored thereon instructions that, when executed by one or more processors, cause the one or more processor to: dividing a first texture image into a first plurality of tiles, the first texture image being configured for application to at least a first three-dimensional mesh; sorting the first plurality of tiles into a sequence of ordered tiles; and providing the sequence of ordered tiles for generation of a coded video, wherein generation of the coded video includes encoding the first plurality of tiles based on the sequence of ordered tiles.

In another example, an apparatus for generating a video from one or more texture images is provided. The apparatus comprises means for dividing a first texture image into a first plurality of tiles. The first texture image is configured for application to at least a first three-dimensional mesh. The apparatus further comprises means for sorting the first plurality of tiles into a sequence of ordered tiles, and means for providing the sequence of ordered tiles for generation of a coded video. Generation of the coded video includes encoding the first plurality of tiles based on the sequence of ordered tiles.

In some aspects, the first plurality of tiles have a uniform tile size.

In some aspects, the first plurality of tiles are sorted into the sequence of ordered tiles to maximize compression efficiency.

In some aspects, the first plurality of tiles are sorted into the sequence of ordered tiles based on similarities among the first plurality of tiles.

In some aspects, the method, apparatuses, and computer-readable medium described above may further comprise: determining similarities between pairs of tiles from the first plurality of tiles; and determining, using the similarities between the pairs of tiles, the sequence of ordered tiles based on the sequence minimizing a sum of dissimilarities between consecutive tiles in the sequence of ordered tiles.

In some aspects, the first plurality of tiles are sorted into the sequence of ordered tiles in an order that minimizes a number of video segments needed to be downloaded to obtain the first texture image. In some examples, the sequence of ordered tiles includes a first sub-sequence and a second sub-sequence. For example, the first sub-sequence can include a first set of tiles from the first plurality of tiles, and the second sub-sequence can include a second set of tiles from the first plurality of tiles.

In some aspects, the method, apparatuses, and computer-readable medium described above may further comprise: dividing a second texture image into a second plurality of tiles, the second texture image being configured for application to at least one of the first three-dimensional mesh or a second three-dimensional mesh; wherein the sorting includes sorting the first plurality of tiles and the second plurality of tiles into the sequence of ordered tiles; and wherein generation of the coded video includes encoding the first plurality of tiles and the second plurality of tiles based on the sequence of ordered tiles.

In some aspects, the first texture image and the second texture image are temporally independent. In some aspects, a first resolution of the first texture image and a second resolution of the second texture image are different resolutions, and the first plurality of tiles and the second plurality of tiles have a uniform tile size (e.g., as a number of pixels).

In some aspects, the first plurality of tiles and the second plurality of tiles are sorted into the sequence of ordered tiles to maximize compression efficiency. In some aspects, the first plurality of tiles and the second plurality of tiles are sorted into the sequence of ordered tiles based on similarities among the first plurality of tiles and the second plurality of tiles. In some examples, the method, apparatuses, and computer-readable medium described above may further comprise: determining similarities between pairs of tiles from the first plurality of tiles and the second plurality of tiles; and determining, using the similarities between the pairs of tiles, the sequence of ordered tiles based on the sequence minimizing a sum of dissimilarities between consecutive tiles in the sequence of ordered tiles.

In some aspects, the first plurality of tiles and the second plurality of tiles are sorted into the sequence of ordered tiles in an order that minimizes a number of video segments needed to be downloaded to obtain the first texture image and the second texture image. In some examples, the sequence of ordered tiles includes a first sub-sequence and a second sub-sequence. For example, the first sub-sequence can include a first set of tiles from the first plurality of tiles, and the second sub-sequence can include a second set of tiles from the first plurality of tiles. In some cases, the sequence of ordered tiles includes a third sub-sequence and a fourth sub-sequence. For example, the third sub-sequence can include a first set of tiles from the second plurality of tiles, and the fourth sub-sequence can include a second set of tiles from the second plurality of tiles.

In some aspects, the coded video is obtained by exploiting similarities between tiles in the sequence of ordered tiles. In some examples, the coded video is generated using motion compensation. For example, the coded video can be generated based on inter-prediction of a first tile using a second tile as a reference tile for prediction. At least a portion of the reference tile can be identified by generating a motion vector from the first tile to the second tile (or from the second tile to the first tile). In some cases, multiple motion vectors can be generated, with each motion vector pointing to a different reference picture. In some examples, the first tile and the second tile are from the first texture image. In some examples, the first tile is from the first texture image, and the second tile is from the second texture image.

In some aspects, a plurality of coded videos are generated for the sequence of ordered tiles. In some cases, a first coded video of the plurality of coded videos can have at least one of a different bit-rate, a different frame rate, or a different segment size (e.g., a number of frames), or any combination thereof, than a second coded video of the plurality of coded videos.

In some aspects, the method, apparatuses, and computer-readable medium described above may further comprise transmitting the coded video for decoding by a client device.

In some aspects, the method, apparatuses, and computer-readable medium described above may further comprise applying a transform function to one or more tiles of the first plurality of tiles, the transform function modifying pixels of the one or more tiles.

In some aspects, modifying the pixels of the one or more tiles using the transform function increases coding efficiency. For example, modifying the pixels of the one or more tiles using the transform function can increase a similarity between the pixels of the one or more tiles and other pixels of the one or more tiles.

In some aspects, the method, apparatuses, and computer-readable medium described above may further comprise generating a data file including contextual data for the first plurality of tiles. The contextual data for a first tile can include at least a tile identifier, an identification of a texture image associated with the first tile, and a location of the first tile within the texture image. In some aspects, the contextual data for the first tile further includes an indication of a transform function. The transform function is configured to modify pixels of one or more tiles of the first plurality of tiles.

According to at least one other example, a method of reconstructing one or more texture images from a video is provided. The method comprises obtaining at least a portion of decoded video including a first plurality of tiles sorted into a sequence of ordered tiles. The first plurality of tiles are associated with a first texture image configured for application to a first three-dimensional mesh. The method further comprises obtaining a data file associated with at least the portion of the decoded video. The data file includes contextual data mapping the first plurality of tiles to the first texture image. The method further comprises reconstructing the first texture image based on the contextual data mapping the first plurality of tiles to the first texture image.

In another example, an apparatus for reconstructing one or more texture images from a video is provided that includes a memory configured to store the one or more texture images and a processor coupled to the memory. The processor is configured to obtain at least a portion of decoded video including a first plurality of tiles sorted into a sequence of ordered tiles. The first plurality of tiles are associated with a first texture image configured for application to a first three-dimensional mesh. The processor is further configured to obtain a data file associated with at least the portion of the decoded video. The data file includes contextual data mapping the first plurality of tiles to the first texture image. The processor is further configured to reconstruct the first texture image based on the contextual data mapping the first plurality of tiles to the first texture image.

In another example, a non-transitory computer-readable medium is provided having stored thereon instructions that, when executed by one or more processors, cause the one or more processor to: obtaining at least a portion of decoded video including a first plurality of tiles sorted into a sequence of ordered tiles, the first plurality of tiles being associated with a first texture image configured for application to a first three-dimensional mesh; obtaining a data file associated with at least the portion of the decoded video, the data file including contextual data mapping the first plurality of tiles to the first texture image; and reconstructing the first texture image based on the contextual data mapping the first plurality of tiles to the first texture image.

In another example, an apparatus for reconstructing one or more texture images from a video is provided. The apparatus comprises means for obtaining at least a portion of decoded video including a first plurality of tiles sorted into a sequence of ordered tiles. The first plurality of tiles are associated with a first texture image configured for application to a first three-dimensional mesh. The apparatus further comprises means for obtaining a data file associated with at least the portion of the decoded video. The data file includes contextual data mapping the first plurality of tiles to the first texture image. The apparatus further comprises means for reconstructing the first texture image based on the contextual data mapping the first plurality of tiles to the first texture image.

In some aspects, contextual data for a tile of the first plurality of tiles includes at least a tile identifier, an identification of a texture image associated with the tile, and a location of the tile within the texture image. In some aspects, the contextual data for the tile further includes an indication of a transform function. The transform function is configured to modify pixels of one or more tiles of the first plurality of tiles.

In some aspects, the method, apparatuses, and computer-readable medium described above may further comprise applying an inverse transform function to the pixels of the one or more tiles of the first plurality of tiles. The inverse transform function is an inverse of the transform function.

In some aspects, the first plurality of tiles have a uniform tile size.

In some aspects, the first plurality of tiles are sorted into the sequence of ordered tiles based on similarities among the first plurality of tiles.

In some aspects, the first plurality of tiles are sorted into the sequence of ordered tiles in an order that minimizes a number of video segments needed to be downloaded to obtain the first texture image. In some examples, the sequence of ordered tiles includes a first sub-sequence and a second sub-sequence. For example, the first sub-sequence can include a first set of tiles from the first plurality of tiles, and the second sub-sequence can include a second set of tiles from the first plurality of tiles.

In some aspects, at least the portion of the decoded video further includes a second plurality of tiles. The second plurality of tiles are associated with a second texture image configured for application to at least one of the first three-dimensional mesh or a second three-dimensional mesh. In some aspects, a first resolution of the first texture image and a second resolution of the second texture image are different resolutions, and the first plurality of tiles and the second plurality of tiles have a uniform tile size.

In some aspects, the first plurality of tiles and the second plurality of tiles are sorted into the sequence of ordered tiles based on similarities among the first plurality of tiles and the second plurality of tiles.

In some aspects, the first plurality of tiles and the second plurality of tiles are sorted into the sequence of ordered tiles in an order that minimizes a number of video segments needed to be downloaded to obtain the first texture image and the second texture image. In some examples, the sequence of ordered tiles includes a first sub-sequence and a second sub-sequence. For example, the first sub-sequence can include a first set of tiles from the first plurality of tiles, and the second sub-sequence can include a second set of tiles from the first plurality of tiles. In some cases, the sequence of ordered tiles includes a third sub-sequence and a fourth sub-sequence. For example, the third sub-sequence can include a first set of tiles from the second plurality of tiles, and the fourth sub-sequence can include a second set of tiles from the second plurality of tiles.

In some aspects, the decoded video is obtained by exploiting similarities between tiles in the sequence of ordered tiles. In some cases, at least the portion of decoded video is generated using motion compensation. For example, at least the portion of decoded video can be generated based on inter-prediction of a first tile using a second tile as a reference tile. At least a portion of the reference tile can be identified using a motion vector from the first tile to the second tile (or from the second tile to the first tile). In some cases, multiple motion vectors can be generated, with each motion vector pointing to a different reference picture. In some cases, the first tile and the second tile are from the first texture image. In some cases, the first tile is from the first texture image, and the second tile is from a second texture image.

In some aspects, a plurality of coded videos are generated for the sequence of ordered tiles. For example, a first coded video of the plurality of coded videos can have at least one of a different bit-rate, a different frame rate, or a different segment size (or any combination thereof) than a second coded video of the plurality of coded videos. In some aspects, the method, apparatuses, and computer-readable medium described above may further comprise receiving, over a network, at least one of a portion of the first coded video or a portion of the second coded video based on at least one or more network conditions associated with the network. In some aspects, at least one of the portion of the first coded video or the portion of the second coded video is received further based on at least one of physical resources of a client device or an application of the client device.

In some cases, the first texture image and the second texture image are temporally independent. In some aspects, each tile of the first plurality of tiles is temporally independent from other tiles of the first plurality of tiles.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 5C is a conceptual diagram illustrating an example of a subset of a sequence of ordered tiles resulting from similarity-based ordering of tiles shown in FIG. 5A and FIG. 5B, in accordance with some examples provided herein;

FIG. 6 is an image illustrating an application of a transform to a tile including part of an object, in accordance with some examples provided herein;

FIG. 9 is a flowchart illustrating an example of a process for generating a video from one or more texture images, in accordance with some examples provided herein;

FIG. 10 is a flowchart illustrating an example of a process for reconstructing one or more texture images from a video, in accordance with some examples provided herein;

DETAILED DESCRIPTION

Figure 1:
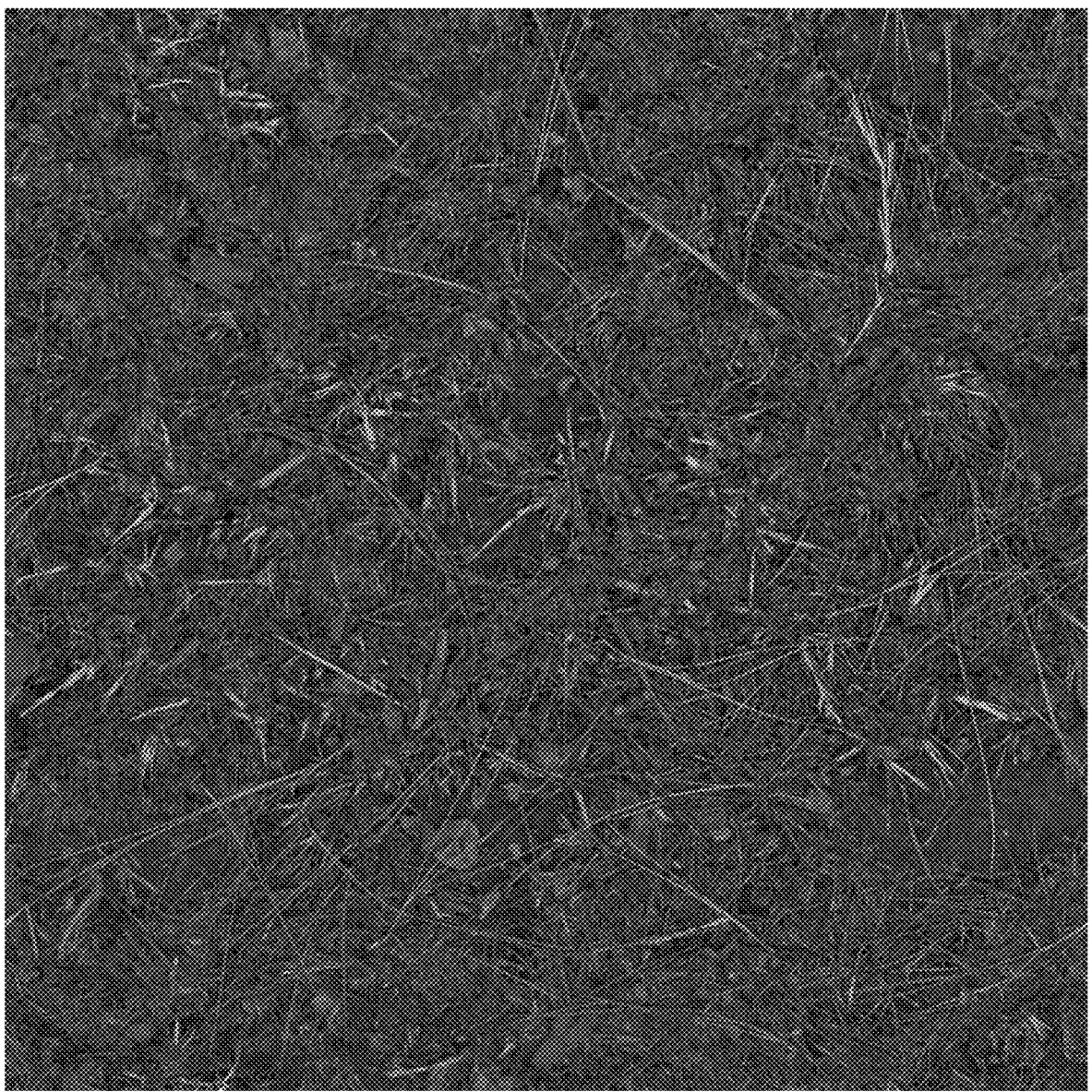
FIG. 1 is an example of a texture image, in accordance with some examples provided herein.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Three-dimensional (3D) video content can be provided for various applications, such as virtual reality (VR) applications, gaming applications (including VR or other gaming systems), audio-video applications (e.g., VR movies or shows, 3D movies or shows, among others), any combination thereof, among many other applications. VR content, for example, can provide the ability for a user to be virtually immersed in a non-physical world created by the rendering of natural and/or synthetic images (and in some cases sound). For instance, a user can interact with a VR environment, such as by moving throughout the environment, interacting with objects in the VR environment, among other interactions. In some cases, a user experiencing a VR video, a VR game, and/or other VR experience can use electronic equipment, such as a head-mounted display (HMD), and optionally certain tools or clothing (e.g., gloves fitted with sensors), to interact with the virtual environment. As the user moves in the real physical world, images rendered in the virtual environment also change, giving the user the perception that the user is moving within the virtual environment. In some applications, images from the real world can be used in the presentation of a virtual reality environment, as opposed to computer-generated graphics, such as may be found in gaming and virtual worlds. For example, a user can play a first-person racing game in Paris, experience a walking tour of Berlin, experience a sporting event in New York, among other events in other locations, while using a VR video system that is physically located in San Francisco.

The growing popularity of applications that process 3D scenes brings new technical challenges related to the delivery of 3D content over a network such as the Internet. For example, delivering rich, high quality three-dimensional (3D) scenes over a network is challenging due to the size of the 3D objects in terms of geometry and textures. The large amount of data associated with a 3D scene is due to each object in a 3D virtual world being defined by one or more 3D meshes and texture data. A 3D mesh (also referred to as a "3D model") of an object can define at least part of a geometry of an object. For example, a 3D mesh can be made up of a number of polygons that define the geometry of the object. Detail can be added to a 3D object by adding more polygons (corresponding to more geometric detail) or by increasing the number of textures used and the resolution of the texture images.

Texture data can be applied to a 3D mesh in order to add detailed properties to an object. The texture data associated with an object can include one or more texture images (also referred to herein as "textures"). The texture images define different properties of the object, and can be applied to one or more 3D meshes to add the properties to the object. In some cases, a single object can have multiple texture images that define different properties of the object.

Figure 2:
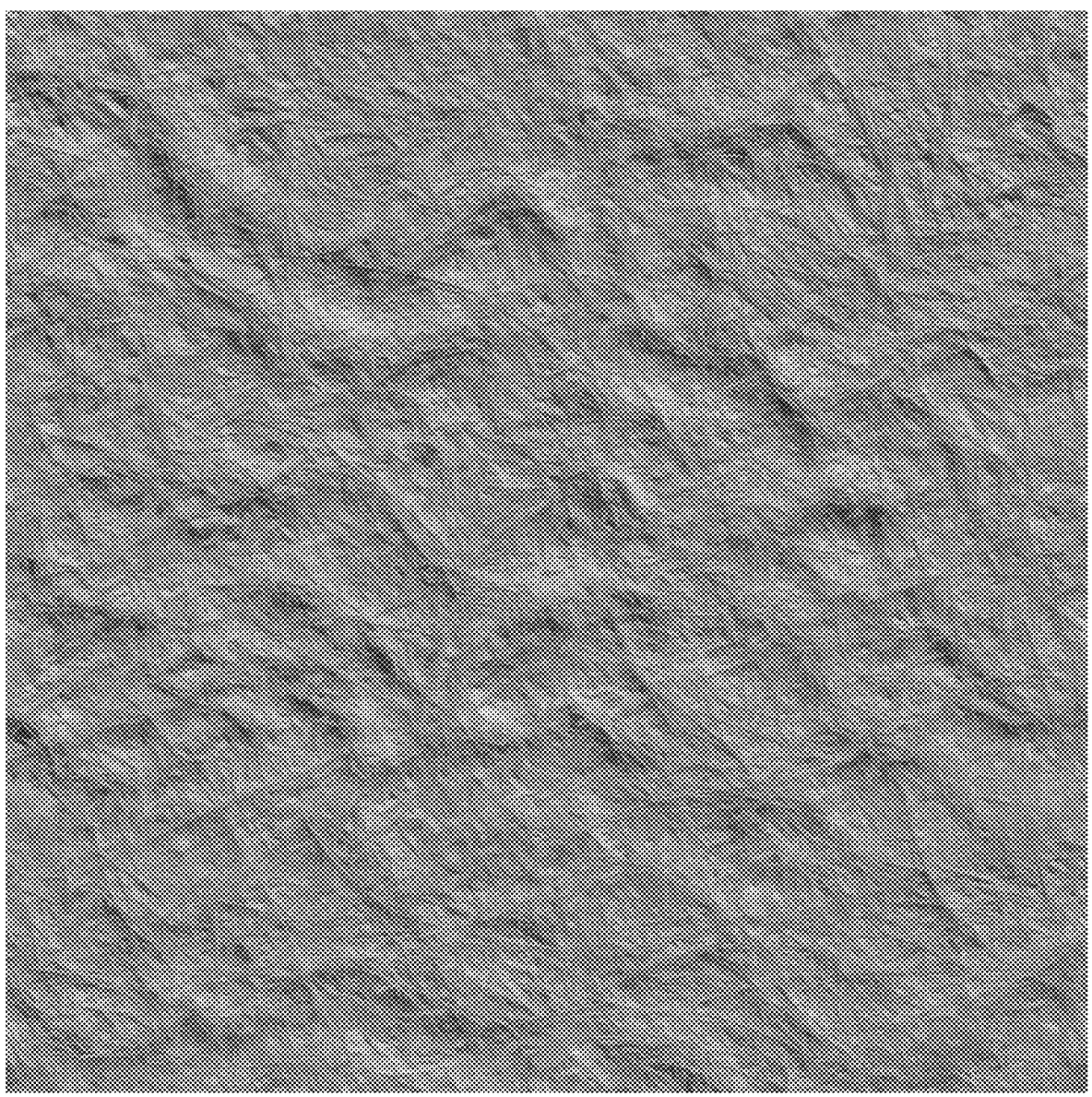
FIG. 2 is another example of a texture image, in accordance with some examples provided herein.

There are various examples of texture images that can be applied to a single object or to multiple objects. For example, a diffuse texture image is a texture with color information. An albedo texture image is similar to a diffuse texture in that it has color information, but also has all shadows and highlights removed. FIG. 1 is an example of an albedo texture image 100 for an object. A normal texture image defines various normals (e.g., an axis of direction) for the surface of an object. FIG. 2 is an example of a normal texture image 200 for an object. A normal texture image can allow a computer to easily understand the shape of an object, such as where bumps or other alterations are on a surface of the object. A displacement texture image defines deformations of the 3D mesh to which the displacement texture is to be applied. A displacement texture can be used in combination with a normal texture in some cases. For example, a normal texture image can be used to define small to medium sized bumps, while a displacement texture image can be used to define larger bumps. In some cases, it can be desirable to use a displacement texture along with an albedo texture in order to add dimensionality to the object.

Figure 3:
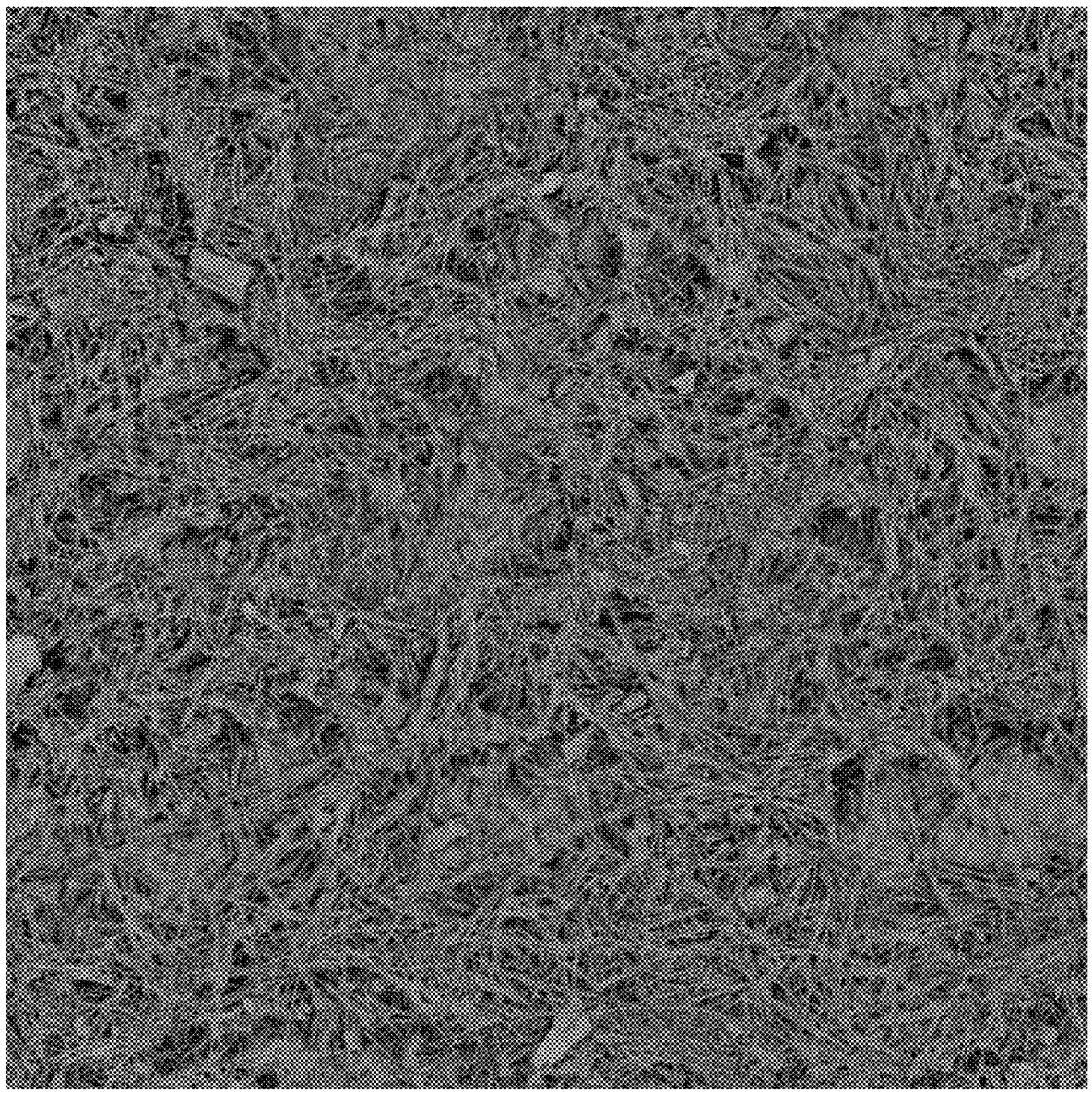
FIG. 3 is another example of a texture image, in accordance with some examples provided herein.

An ambient occlusion texture image indicates how exposed each point in a scene is to ambient lighting. For instance, an ambient occlusion texture appears as shadows on an object as if the object was evenly illuminated from all sides. A mask texture image (or transparency texture image) defines which pixels of the texture image must be taken into account when rendered. FIG. 3 is an example of a mask texture image 300 for an object. A mask texture image can be used to define the shape of an object. For example, the shapes of blades of grass can be defined by a mask texture image, which can indicate the regions of the 3D mesh polygons that are to be made transparent (by masking the pixels) and the regions for which pixels are to be rendered, effectively cutting the blades of grass out the polygonal shapes. A roughness texture image defines the sharpness of reflections on the surface of an image. A gloss texture image can also be used to define the sharpness of reflections on the surface of an image. A gloss texture image can be an invert of a roughness texture image. Other types of texture images are also available.

A texture image is a two-dimensional array of values defining the properties of the texture image. For example, an albedo texture image can include values at each pixel of the image, with each pixel including a red value, a green value, and a blue value (for red-green-blue (RGB) images), or other suitable color component value, defining a color at that location on the surface of the object. In another example, a normal texture map can include RGB values (or other color component values) at each pixel location, with each RGB color representing a different axis of direction (defining the normal at that pixel location). In some cases, a texture image can be three-dimensional.

The various mappings provided by texture images (e.g., color mapping, bump mapping, displacement mapping, normal mapping, height mapping, reflection mapping, specular mapping, occlusion mapping, among others) has led to the ability of systems to simulate realistic 3D scenes in real-time by reducing the number of polygons and lighting calculations needed to construct a realistic and functional 3D scene. However, texture images can have high resolutions in order to provide the detail necessary to create a high-quality, realistic 3D scene. High-quality, photorealistic 3D scenes may contain hundreds, thousands, or even more objects in some cases, which can amount to gigabytes of information when uncompressed. The large amount of data can place a burden on devices and network infrastructure, and can lead to a poor user experience. For example, before starting an immersive experience associated with 3D content, a client device needs to download the 3D objects composing the scene. The large amount of data required to generate the 3D objects can lead to unacceptable loading times in spite of recent progress in network bandwidth and delivery. Advances have been made in compression and delivery of 3D meshes. However, less attention has been focused on the delivery of texture images over a network.

In some examples, one or more systems, apparatuses, methods, and computer-readable media described herein are directed to providing efficient and adaptive delivery and processing of the texture images. As described in more detail herein, the systems and techniques described herein provide universality, adaptivity, and optionality with respect to texture images. Universality is provided due to the system not requiring the implementation of new software or physical infrastructure in the delivery chain. For example, the texture images can be processed in a way that allows existing content delivery infrastructures (e.g., Content Delivery Networks (CDNs)) and end-user equipment and applications to be used. The use of developed delivery and processing systems allows the use of fine-grained control of the quality of the resulting video sequence. Adaptivity is a desirable feature of scalable delivery solutions, as evidenced by the massive adoption of HTTP Adaptive Streaming (HAS) for video delivery. The systems and techniques enable adaptive delivery of texture images with respect to network and device resources. Optionality is obtained by processing the texture images in a way that allows multiple options for clients to choose between the quality of the displayed content and the delay in obtaining it over a network. Optionality is important in view of the mismatch between the size of the texture image data that is to be delivered and the physical network resources.

The systems and techniques described herein allow texture images to be encoded and delivered as a video sequence, rather than being delivered independently as individual texture images or as individual encoded texture images. For example, rather than compressing the textures images one by one and delivering the texture images independently, a sequence of textures is generated and compressed using video encoding techniques. The resulting compressed video sequence can then be delivered using any suitable video streaming technique. Representing the textures as a video sequence rather than individual images allows the provider to reuse the optimized delivery chain already available for streaming videos, both in terms of infrastructure and software (universality) and algorithms (adaptivity). As noted previously, a more fine-grained control of the texture delivery chain (optionality) is also provided, without sacrificing quality.

Figure 4:
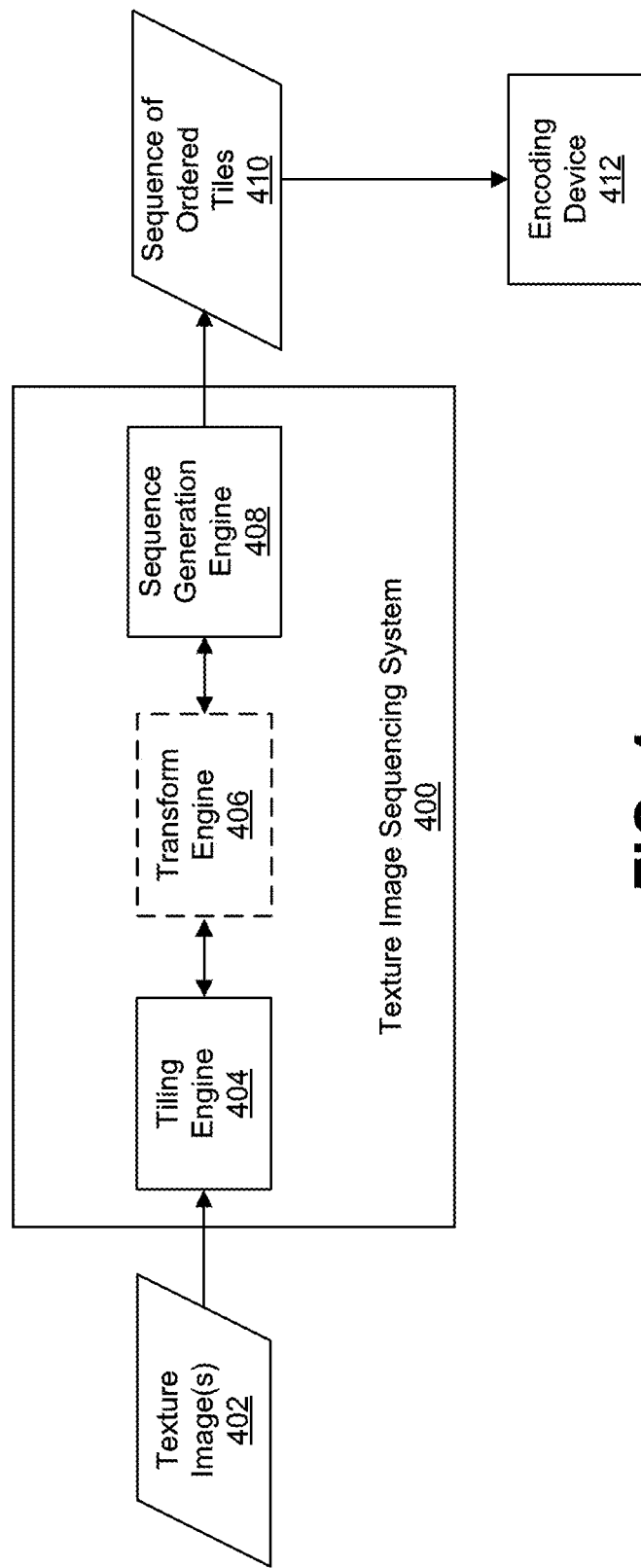
FIG. 4 is a block diagram illustrating an example of a texture image sequencing system, in accordance with some examples provided herein.

FIG. 4 is a block diagram illustrating an example of a texture image sequencing system 400. The texture image sequencing system 400 can be included in a computing device. For example, the computing device can include a server, a personal computer, a tablet computer, and/or any other computing device with the resource capabilities to perform the techniques described herein. The texture image sequencing system 400 has various components, including a tiling engine 404, a transform engine 406 (which is optional, as indicated by the dotted outline shown in FIG. 4), and a sequence generation engine 408. The components of the texture image sequencing system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the texture image sequencing system 400 is shown to include certain components, one of ordinary skill will appreciate that the texture image sequencing system 400 can include more or fewer components than those shown in FIG. 4. For example, the texture image sequencing system 400 may also include, in some instances, one or more memory devices (e.g., one or more random access memory (RAM)

components, read-only memory (ROM) components, cache memory components, buffer components, database components, and/or other memory devices), one or more processing devices (e.g., one or more CPUs, GPUs, and/or other processing devices), one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 4.

The texture image sequencing system 400 can obtain one or more texture images 402. The one or more texture images 402 can be received from another device, obtained from storage, generated by the computing device that includes the texture image sequencing system 400, or can be obtained in any other way. In some cases, the one or more texture images 402 can include multiple texture images that are needed to generate a 3D scene (e.g., a VR world for a game, a movie, or other type of media). The one or more texture images 402 can include any suitable type of texture image that is configured for application to one or more 3D meshes. For example, the one or more texture images 402 can include a diffuse texture image, an albedo texture image, a normal texture image, a displacement texture image, an AO texture image, a mask texture image, a roughness texture image, a gloss texture image, any other type of texture image, or any combination thereof.

The one or more texture images 402 can be received by the tiling engine 404 for processing. The tiling engine 404 can divide each texture image of the one or more texture images 402 into multiple tiles. The tiles generated by the tiling engine 404 can be overlapping or non-overlapping. While examples are described herein using non-overlapping tiles for illustrative purposes, one of ordinary skill will appreciate that the techniques can be applied to overlapping tiles. The input video frames that are provided to a video encoder should have a uniform resolution (referred to as the video resolution). The tiling engine 404 can divide the one or more texture images 402 so that the tiles have a uniform tile size. For example, the tiles of one texture image can all have the same uniform tile size, and the tiles of all other texture images can have the same uniform tile size. It is noted that the different texture images can have different resolutions. The tiling engine 404 can divide the texture images with the differing resolutions into tiles having the same uniform size. In some examples, the uniform tile size is defined as a number of pixels, allowing different resolutions of texture images to be combined into a video. In the event the resolution of a texture image is not a multiple of the tile size, there may be one or more portions of the texture image that cannot be divided into a tile having the uniform tile size. In such cases, different techniques can be performed to create a tile with the uniform tile size. In one example, padding can be performed to create a tile with the uniform tile size. In another example, certain pixels can be left uncompressed to create a tile with the uniform tile size. The uniform tile size allows the tiles to be encoded by a video encoder as if they were video frames having a certain video resolution. For example, the uniform tile size of the tiles essentially becomes the video resolution of the sequence of ordered tiles that are provided to the encoder.

Figure 5A:
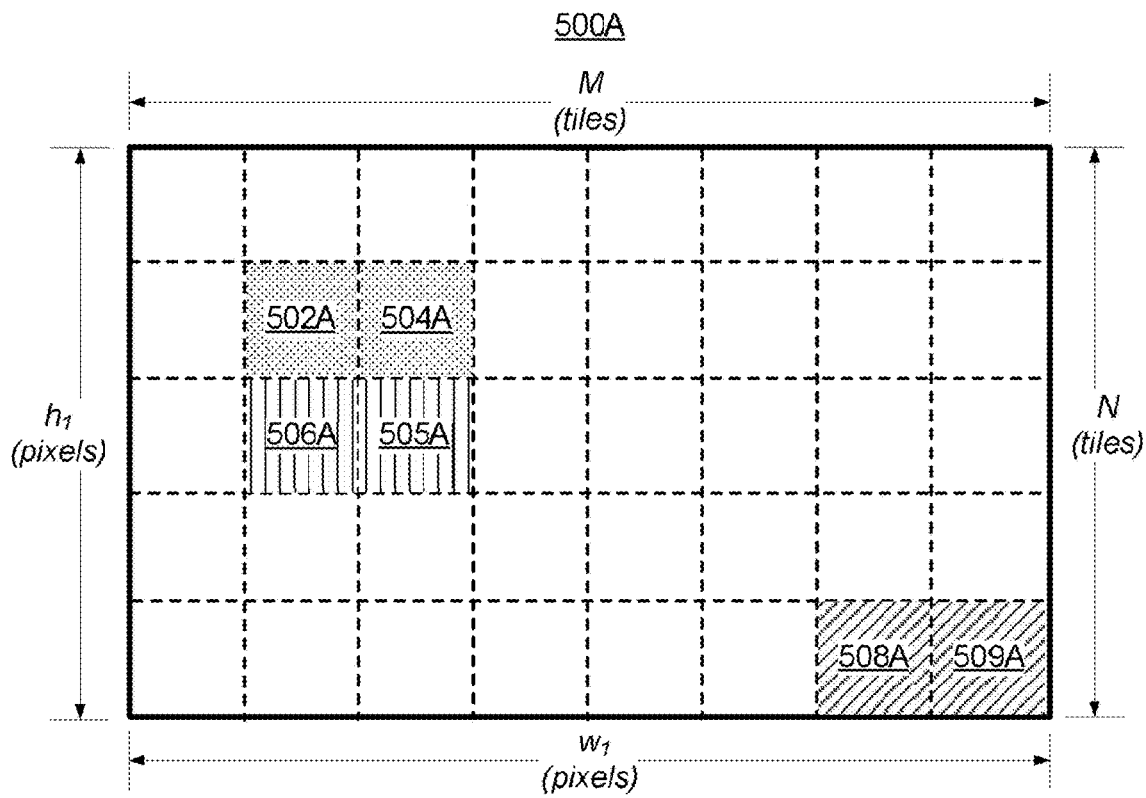
FIG. 5A and FIG. 5B are conceptual diagrams illustrating examples of two different texture images divided into tiles, in accordance with some examples provided herein.
Figure 5B:
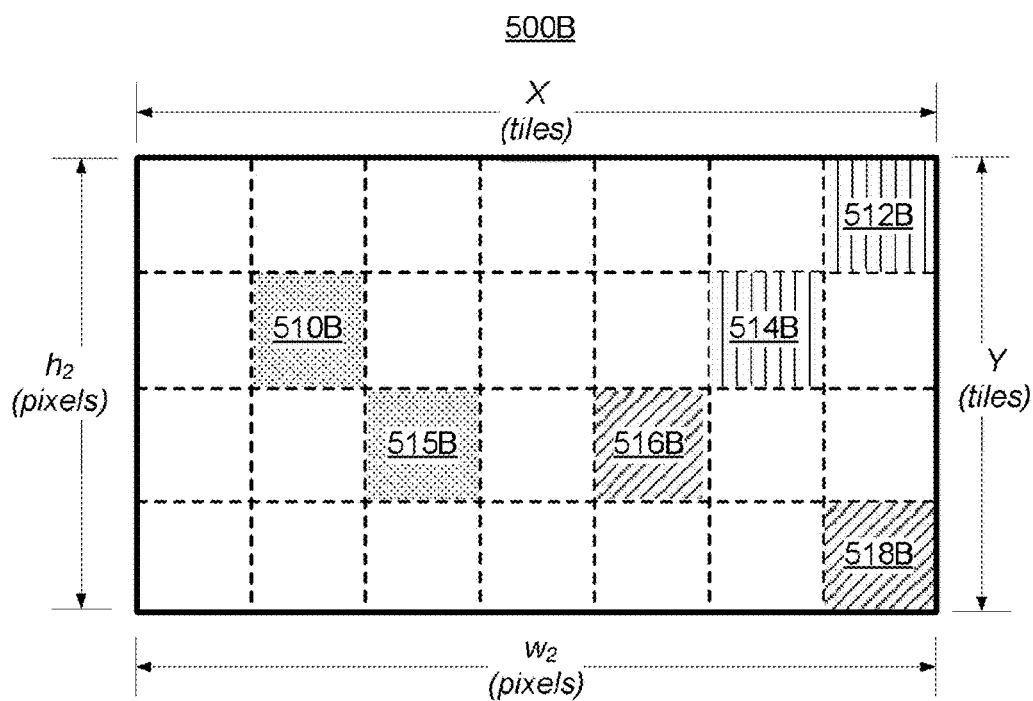

FIG. 5A and FIG. 5B are conceptual diagrams illustrating examples of two different texture images 500A and 500B divided into tiles. As shown, the resolution of the texture image 500A is different than the resolution of the texture image 500B. The resolution (in terms of pixels) of the texture images 500A and 500B can be denoted as width (w)×height (h). Using such notation, the texture image 500A has a resolution of $w_1$ pixels×$h_1$ pixels, and the texture image 500B has a resolution of $w_2$ pixels×$h_2$ pixels. The resolutions of the texture images 500A and 500B can be any suitable amount, and can be chosen based on the desired quality of the properties provided by the textures. In one illustrative example, the resolution of the texture image 500A is 2048×640, and the resolution of the texture image 500B is 1792×512. Some texture images can have 8K (e.g., 7680×4320) or even higher resolutions.

The tiling engine 404 can divide the texture image 500A into M tiles×N tiles, including the tiles 502A, 504A, 505A, 506A, 508A, and 509A, among others. The tiling engine 404 can also divide the texture image 500B into X tiles×Y tiles, including tiles 510B, 512B, 514B, 515B, 516B, and 518B, among others. As previously noted, the texture images 500A and 500B can be divided into tiles having a uniform tile size. Continuing with the illustrative example from above, the uniform tile size can be set at a size of 256×128 pixels. Using a 256×128 uniform tile size, the tiling engine 404 can divide the 2048×640 texture image 500A into 8 tiles (M)×5 tiles (N), with each tile having a size of 256×128. The tiling engine 404 can also divide the 1792×512 texture image 500B into 7 tiles (M)×4 tiles (N), with each tile having a size of 256×128. As a result, the tiling engine 404 can generate a total of sixty-eight 256×128 tiles from the texture image 500A and the texture image 500B. In such an example, the video resolution of the tiles (from the perspective of the video encoder) will be 256×128.

In some implementations, the texture image sequencing system 400 can include a transform engine 406 that can be used to transform the pixels of one or more tiles before the tiles are provided to the sequence generation engine 408. The transform engine 406 is an optional component of the texture image sequencing system 400, as indicated by the dotted outline in FIG. 4. The transform engine 406 can apply one or more transforms to certain parts of an image for various reasons. An example of a transform applied by the transform engine 406 is described with reference to FIG. 6.

FIG. 6 is an example of a texture image 600 with a butterfly object. The texture image 600 has a resolution 300×100 (width×height). The tiling engine 404 can divide the texture image 600 into two tiles 602 and 604. Each of the tile 602 and 604 takes up half the image, and thus each have a resolution 150×100. As can be seen from the texture image 600, the tile 602 and the tile 604 have few similarities. If one of the tiles 602 or 604 were mirrored using a mirroring transform (e.g., a horizontal function), there would be identical tiles. For example, the transform engine 406 can apply a mirroring transform to the tile 604 in order to generate a mirrored version of the tile 604, in which case the mirrored version of the tile 604 would be identical to the tile 602. By mirroring the tile 604 and making it identical to tile 602, the encoding efficiency can be increased when the tile 602 and the mirrored tile 604 are encoded by the video encoder. For example, the video encoder can exploit this similarity to efficiently compress the video. An example of a configuration file that could be included in a data file (described in more detail below) to indicate the mirroring function is as follows (the example is given using a horizontal function as an example of a mirroring function):

| nameTile | ImageTexture | X_pos | Y_pos | function |
|---|---|---|---|---|
| Left_image | butterfly | 0 | 0 | plain |
| Right_image | butterfly | 150 | 0 | horizontal_mirror |

The texture image 600 is denoted in the configuration file as "butterfly," the tile 602 is denoted as "Left_image," and the tile 604 is denoted in the configuration file as "Right_image." The denotation "X_pos" indicates the x-coordinate of the top-left pixel of the corresponding tile 602 or 604, and the denotation "Y_pos" indicates the y-coordinate of the top-left pixel of the corresponding tile 602 or 604. For example, the top-left pixel of the tile 602 has an (x, y) coordinate position of (0, 0), and the top-left pixel of the tile 602 has an (x, y) coordinate position of (150, 0) (based on the resolution of the texture image 600 being 300×100 and each tile having a resolution of 150×100). The configuration file can indicate to a client device that the client device has to apply a horizontal mirroring function (denoted as "horizontal_mirror") on the pixels of the tile 604 ("Right_image") before using the tile 604 to reconstruct the texture image 600. The "plain" function in the configuration file indicates that no transform is to be applied to the pixels of the tile 602 ("Left_image"). Other types of transforms (e.g., warping, unwarping, etc.) can also be applied to tiles to, for example, increase coding efficiency.

The tiles generated by the tiling engine 404 (and in some cases one or more tiles transformed by the transform engine 406) can be output to the sequence generation engine 408. The sequence generation engine 408 can generate a sequence of ordered tiles 410 by sorting the tiles into a particular order. As described in detail below, the sequence of ordered tiles 410 is the video that is be encoded. Different ordering techniques can be used by the sequence generation engine 408 to sort the tiles when generating the sequence of ordered tiles 410. Examples of ordering techniques can include similarity-based ordering, sub-sequence based ordering, a combination thereof, or other type of ordering or sorting.

Using a similarity-based ordering, the sequence generation engine 408 can determine an order of the tiles based on similarities among the tiles of the one or more texture images 402. Similarity between tiles can be determined based on the pixel values of the tiles. As noted above, pixel values in a texture image can be used to define various properties, such as color, depth, occlusions, among other properties. The pixel values of different tiles can be compared in order to find similarities among the tiles. In one illustrative example, the dissimilarity (denoted as $d_{i,j}$ below) between every pair of texture tiles can be determined using any suitable similarity measure. In one example, a Mean Absolute Error (MAE) can be used to determine the dissimilarity. Other examples of difference-based calculations that can be used include Mean Squared Error (MSE), Root Mean Squared Error (RMSE), sum of absolute difference (SAD), sum of square difference (SSD), or other suitable calculation. The dissimilarities between tiles can be aggregated into a distance matrix D (described below).

In some examples, the ordering of the tiles (from the one or more texture images 402) in the sequence of ordered tiles 410 can be determined by modeling the tile ordering as an assignment problem, a traveling salesman problem, or other similarity-based problem. In one illustrative example, the optimal solution of the sequence ordering can obtained by solving (e.g., using dynamic programming or other suitable technique) the minimum traveling salesman problem given the distance matrix $D = \{d_{i,j}, \forall i,j \in T\}$, where T is the set of tiles that are to be included in the sequence of ordered tiles 410, and $d_{i,j}$ is the dissimilarity between two independent tiles i and j (i=1, 2, ..., n, with n being the number of tiles in the set T). As noted above, the dissimilarity can be determined using MAE, MSE, RMSE, SAD, SSD, or other suitable difference-based calculation. The symbol ∀ is universal quantifier, indicating that the stated assertions, here D, holds "for all instances" of the given variable i (the subject tile). The symbol E is used to indicate that j is an element of T (and thus that each tile j belongs to the set of tiles T). An example of the distance matrix D is as follows:

$$\mathcal{D} = \begin{matrix} & 1 & 2 & 3 & \ldots & n \\ 1 & \begin{pmatrix} d_{11} & d_{12} & d_{13} & \ldots & d_{1n} \\ 2 & d_{21} & d_{22} & d_{23} & \ldots & d_{2n} \\ \vdots & \vdots & \ldots & \ldots & \ldots & \ldots \\ n & d_{n1} & d_{n1} & d_{n3} & \ldots & d_{nn} \end{pmatrix} \end{matrix}$$

The solution maximizes the sum of the similarities (or minimizes the sum of dissimilarities) between consecutive images, and includes all tiles in the set of tiles T. The result of the solving the traveling salesman problem (e.g., using dynamic programming or other suitable technique) is a sequence of ordered tiles 410 (which can be denoted as S). Other similarity-based solutions can also be used, such as the Hungarian method, an assignment problem, or other similarity-based problem.

Returning to FIG. 5A and FIG. 5B, the tiles 502A and 504A of the texture image 500A, and the tiles 510B and 515B of the texture image 500B can be determined to be similar by the sequence generation engine 408. The sequence generation engine 408 can also determine that the tiles 505A and 506A of texture image 500A, and the tiles 512B and 514B of texture image 500B are similar. The sequence generation engine 408 can further determine that the tiles 508A and 509A of texture image 500A, and the tiles 516B and 518B of texture image 500B are similar.

Based on the similarity determinations, the various tiles of the texture images 500A and 500B can be sorted in a sequence of ordered tiles. FIG. 5C is a diagram illustrating an example of a subset of a sequence of ordered tiles 500C resulting from a similarity-based ordering of the tiles form the texture images 500A and 500B. As shown in FIG. 5C, the tiles 502A, 504A, 510B, 515B are consecutively placed in the sequence of ordered tiles 500C. Similarly, the tiles 505A, 506A, 512B, 514B are consecutively placed in the sequence of ordered tiles 500C, followed by the tiles 508A, 509A, 516B, 518B.

The similarity-based ordering can ensure that consecutive images in the sequence of ordered tiles have a high similarity. As illustrated in FIG. 5C, the similarity-based ordering can also result in a sequence of ordered tiles that includes tiles of different texture images (e.g., texture image 500A and texture image 500B) being interspersed throughout the sequence (e.g., sequence of ordered tiles 500C). By maximizing the similarity between consecutive tiles, high coding efficiency can be obtained due to the ability of the video encoder to exploit the similarity to efficiently compress the video.

Another example of an ordering technique that can be performed by the sequence generation engine 408 is a sub-sequence based ordering. The sub-sequence based ordering can sort the tiles with respect to segments of video having a certain number of seconds, resulting in the sequence of ordered tiles including a number of sub-sequences. In some cases, the sub-sequence based ordering can ensure that most or all of the tiles of a given texture image are in a minimum number of sub-sequences. For example, a video is divided into segments having the same duration, such as one second durations (corresponding to 30 frames for a 30 FPS video), two second durations (corresponding to 60 frames for a 30 FPS video), or other suitable durations. A segment size (also referred to as a segment duration or a segment length) can be defined in terms of a number of frames (e.g., a segment of four frames, six frames, 30 frames, or other suitable size) or in terms of an amount of time (e.g., one second, corresponding to 30 frames in a 30 FPS video, or other suitable amount of time).

In some implementations, segment size can be used as an input parameter to form independently decodable coded video sequences by the video encoder. For instance, in some cases, the segment size can be provided as an input parameter to the video encoder. In some cases, the segment size is not a required input parameter. As noted above, a texture image can be divided into multiple tiles, which can result in k tiles (where k depends on the texture image resolution and the uniform tile size). This parameter k can be greater than or less than a segment size. For example, if the k number of tiles is greater than the segment size, then all tiles of a given texture image will not fit in a single segment. On the other hand, if the k number of tiles is less than the segment size, then all tiles of a given texture image will fit in a single segment. The sub-sequence based ordering can be used to minimize the number of segments that are required to deliver all tiles of the texture image, which can be achieved by sorting the tiles of a given texture image into sub-sequences. The sub-sequences include consecutive tiles from a texture image.

In one illustrative example, two video segments of two seconds each (60 frames in a 30 FPS video) can be provided. A first texture image can be divided into 96 tiles. When generating the sequence of ordered tiles, the tiles can be sorted into a sub-sequence that fits into two segments—an entire first segment (with a size of 60 frames) is filled with 60 tiles of the first texture image. The 36 remaining tiles are placed in a second segment (also with a size of 60 frames), leaving 24 frames that can be added to the second segment. The 24 other frames of the second segment can come from tiles of a second texture image, which can be divided into 84 tiles. The 84 tiles of the second texture image can be sorted into a sub-sequence that is partly in the second segment (e.g., the 24 frames), and the remaining 60 tiles can be placed in a third segment. In some cases, the similarity-based ordering described above can be applied to tiles of a texture image in order to determine the order of the tiles. In such cases, the similarity-based ordering is applied to each texture image individually. By applying the similarity-based ordering to tiles of a texture image, the similarity between consecutive tiles of that texture image can be maximized Other techniques for ordering the tiles can be performed in addition to or as an alternative to the similarity-based ordering and the sub-sequence based ordering.

Figure 5D:
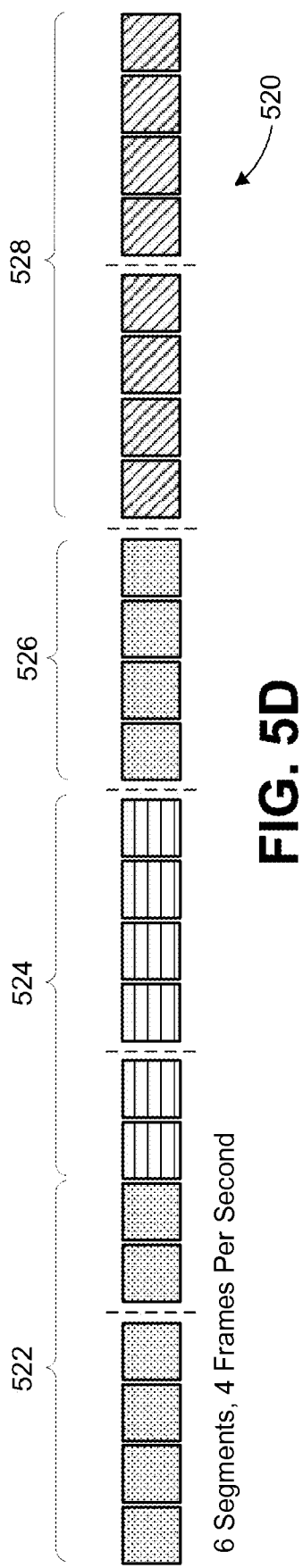
FIG. 5D and FIG. 5E are conceptual diagrams illustrating examples of two sequences of ordered tiles resulting from a sub-sequence based ordering of tiles, in accordance with some examples provided herein.

FIG. 5D is a diagram illustrating an example of different sub-sequences (including sub-sequence 522, sub-sequence 524, sub-sequence 526, and sub-sequence 528) of a sequence of ordered tiles 520 ordered using the sub-sequence based ordering. The tiles in the sequence of ordered tiles 520 are from three different texture images, labeled as Texture A, Texture B, and Texture C. Texture A is divided into ten tiles, Texture B is divided into six tiles, and Texture C is divided into eight tiles, as shown in FIG. 5D. A parameter that can be input into the encoder includes a length of the video segments will be generated in the video. In the example shown in FIG. 5D, a video is generated with a segment size equal to four frames. As a result, the sequence of ordered tiles 520 includes six segments (shown as being divided by a dotted line for illustrative purposes), with each segment having a duration of one second at a frame rate of four frames per second.

In adaptive streaming, there is a tradeoff between adaptivity (e.g., the shorter segments, the faster the reaction to bandwidth changes) and compression performance (e.g., the longer the segments, the better the compression). The size of a segment is important because, in some cases, streaming systems include random access point (RAP) pictures (e.g., an instantaneous decode reference (IDR) picture, broken link access (BLA) picture, or other appropriate random access point picture) at the beginning of each segment. A segment beginning with a RAP is referred to herein as a RAP segment. RAP pictures are larger in size than other tiles of the segment (due to the RAP being an intra-frame). The longer the segment, the less constrained the encoder is and thus better compression can be obtained. On the other hand, the shorter a segment is, the quicker the client device (with a video decoder) can adapt to changes in network conditions. For example, a one second segment can allow quick changes because a client device can switch from one segment to another every second; however, one second segments also require more RAPs to be included in the video bitstream. Including as many tiles of a given texture image in as few segments as possible allows a client device to obtain the tiles for the texture image more efficiently. Some adaptive streaming systems (e.g., HLS) allow non-RAP segments. A non-RAP segment is a segment that does not include a RAP picture. In some implementations, even in such systems, all segments can be forced to be RAP segments (e.g., segments having a RAP picture at the beginning of each segment), essentially making the segments an integral number of coded video sequence (CVSs). For instance, a CVS can include a series of pictures (e.g., access units), starting with a RAP picture up to and not including a next RAP picture.

The sub-sequence based ordering considers the segment size to order the tiled images so that a number of video segments that need to be downloaded in order to obtain the texture image is minimized. The sequence of ordered tiles 520 is optimal (in terms of the number of segments per texture image) because of the use of the various sub-sequences 522, 524, 526, and 528, which adjust well to the segments. As shown in FIG. 5D, the ten tiles of the Texture A are divided into two sub-sequences 522 and 526. The first sub-sequence 522 for Texture A includes six of the ten tiles, and the second sub-sequence 526 includes the other four tiles from Texture A. As a result, a client device will need to download and decode the three segments (the first, second, and fourth segments) in order to obtain the tiles necessary to reconstruct Texture image A. The six tiles from texture B are included in a single sub-sequence 524, which is divided across two segments. A client device will need to download and decode the two segments (the second and third segments) in order to obtain the tiles necessary to reconstruct Texture image B. The eight tiles from texture C are also included in a single sub-sequence 528, which is divided across two segments. A client device will need to download and decode last two segments in order to obtain the tiles necessary to reconstruct Texture image C.

Figure 5E:
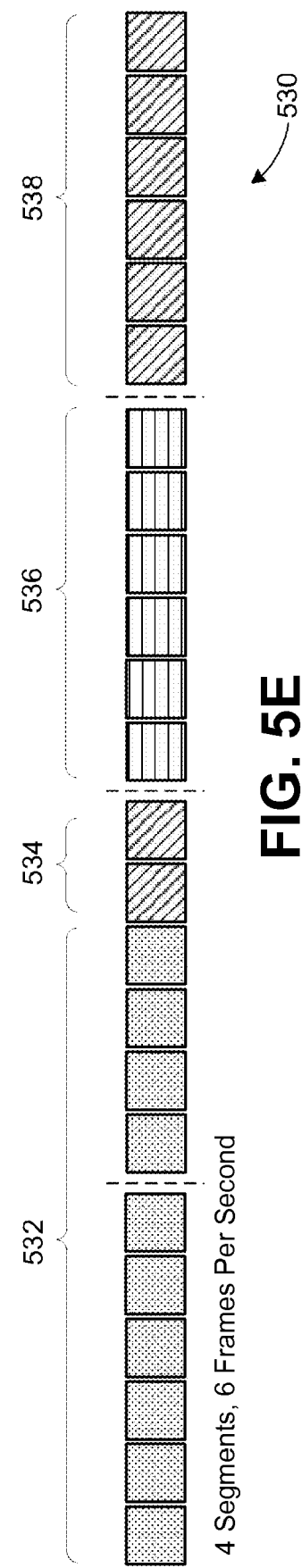

FIG. 5E is a diagram illustrating another example of different sub-sequences (including sub-sequence 532, sub-sequence 534, sub-sequence 536, and sub-sequence 538) of a sequence of ordered tiles 530, which is ordered using the sub-sequence based ordering. The tiles in the sequence of ordered tiles 530 are from the same three different texture images as FIG. 5D—Texture A (including ten tiles), Texture B (including six tiles), and Texture C (including eight tiles). As shown in FIG. 5E, a video is generated with a segment size equal to six frames. As a result, the sequence of ordered tiles 530 includes four segments (shown as being divided by a dotted line for illustrative purposes), with each segment having a duration of one second at a frame rate of six frames per second.

The sequence of ordered tiles 530 is optimal (in terms of the number of segments per texture image) because of the use of the four sub-sequences 532, 534, 536, and 538. As shown, the ten tiles of the Texture A are included in a single sub-sequence 532. The sub-sequence 532 is divided across the first two segments of the video. As a result, a client device will need to download and decode two segments (the first and second segments) to obtain the tiles necessary to reconstruct Texture image A. The second segment also includes two tiles from Texture C. The six tiles from texture B are also included in a single sub-sequence 536. The sub-sequence 536 is included in a single segment. A client device will need to download and decode only one segment (the third segment) in order to obtain the tiles necessary to reconstruct Texture image B. The eight tiles from texture C are divided into two sub-sequences 534 and 538. The first sub-sequence 534 for Texture C includes two of the eight tiles, which are included in the second segment that also includes the tiles from Texture A. The second sub-sequence 538 for Texture C includes the other six tiles from Texture C, and is included in the fourth segment. A client device will need to download and decode two segments (the second and fourth segments) in order to obtain the tiles necessary to reconstruct Texture image C.

A similarity-based ordering can also be applied separately to the tiles in the Texture A, Texture B, and Texture C, so that the similarity between consecutive tiles within the sub-sequences can be maximized. In some cases, when sub-sequence based ordering is performed, the similarity-based ordering can be applied separately to groups of texture images that are required at the same time (e.g., when a request is received for a particular 3D object that requires multiple texture images). For example, referring to FIG. 5D, the first six tiles from Texture A can be included in the sub-sequence 522 based on their similarity to one another. Performing the similarity-based ordering in addition to the sub-sequence based ordering can allow efficiencies with respect to download times, while also providing for a high coding efficiency (due to the video encoder being able to exploit the similarity to efficiently compress the video).

Once the order is determined, the sequence of ordered tiles 410 can be provided as input frames to an encoding device 412 (also referred to as a video encoder), which can generate one or more texture videos (referred to as an encoded texture video bitstream) using the sequence of ordered tiles 410. The encoding device 412 treats the tiles in the sequence of ordered tiles 410 as individual image frames, and produces encoded tiles making up a texture video. The encoded tiles can also be referred to herein as encoded pictures. For example, the encoding device 412 can encode the sequence of ordered tiles 410 to produce an encoded texture video bitstream that includes the encoded tiles, a data file, and other information. The data file can include a set of metadata (also referred to as "contextual data") that enables the reconstruction of the texture images.

Any type of video coding can be performed by the encoding device 412. Examples of video coding tools that can used by the encoding device 412 include ITU-T H.261 (ISO/IEC MPEG-1 Visual), ITU-T H.262 (ISO/IEC MPEG-2 Visual), ITU-T H.263 (ISO/IEC MPEG-4 Visual), ITU-T H.264 (ISO/IEC MPEG-4 AVC), including the Scalable Video Coding (SVC) and Multiview Video Coding (MVC) extensions of AVC, ITU-T H.265 (High Efficiency Video Coding (HEVC)), the range and screen content coding extensions of HEVC including 3D video coding (3D-HEVC), the multi-view extensions (MV-HEVC), and the scalable extension (SHVC), Versatile Video Coding (VVC), and/or other video coding standard in development or to be developed. An illustrative example of a video encoding device 1200 is described with reference to FIG. 12.

Other input parameters can also be provided to the video encoder, such as a number of frames per second (FPS), a target video bit-rate, a number of independently decodable and downloadable segments to include in the video, any combination thereof, and/or other parameters. Unlike standard video that includes frames having a temporal relationship (e.g., frames of a video are output or played in a certain order), the texture images and the individual tiles of the texture images are temporally independent because they do not have any temporal or time-based relationship. Such temporal independency among the texture images and tiles allows any FPS value to be chosen.

The FPS and bit-rate parameters allow a service provider to generate multiple versions of the same video (having the set of textures) with multiple qualities and multiple delivery delays. As noted above, the tiles have no temporal relation, so any value for FPS can be chosen (e.g., by a user, by the content provider, or the like). The higher the FPS, the more tiles that will be sent per time unit, and the shorter the time that is needed to deliver the whole set of tiles for the one or more texture images 402. In one example, for a sequence S containing 300 images, a setting FPS=30 results in a video that is 10 seconds long. For a given parameter FPS, the video bit-rate enables the settings of the quality. The higher the bit-rate is, the lower the compression and thus the higher the quality of the images will be. Both FPS and bit-rate parameters allow the service provider to prepare multiple versions of the same set of textures T, with multiple qualities and multiple delivery delays. A large number of qualities accommodates varying bandwidth conditions, while multiple delivery delays enables scheduling the delivery of textures based on when the client needs them and/or when a service provider requires them.

Each coded video of the same content having a differing quality is referred to as a representation. In some cases, multiple sets of representations can be generated for a single texture video (corresponding to a single sequence of ordered tiles). Each different set of representations can have different segment sizes based on the segment size input parameter. The different representations within a given representation set have the same segment size but can have different bit-rates and/or frame rates. For example, a set of two representations can have a segment size of one second, with one representation having a 1 megabit/second (MB/s) bit-rate and the other representation having a 2 MB/s bit-rate. For the same texture video, a second set of two representations can have a segment sizes of ten seconds, with one representation having a 1 MB/s bit-rate and a second representation having a having a 2 MB/s bit-rate. A client device can receive one of the representations based on the network conditions, and in some cases based on constraints of the client device (e.g., processing capabilities, memory capacity, abilities of a 3D graphics rendering application, etc.). For example, if the network bandwidth is sufficient at a moment in time, the client device can receive a high bit-rate texture video (e.g., at 2 MB/s bit-rate). At another moment in time, the bandwidth conditions may deteriorate, in which case the representation received by the client device may be switched to a lower bit-rate texture video (e.g., at 1 MB/s bit-rate).

As noted above, a data file can be provided with the encoded video. As described in more detail below, the data file can be used by a decoder to reconstruct the texture images. The data file can include contextual data for the tiles of the one or more texture images 402. The contextual data (also referred to as a configuration file) for a tile of a texture image can include a tile identifier, an identification of a texture image associated with the tile, a location of the tile within the texture image, an indication of a transform function, any combination thereof, and/or other contextual information. As described above, a transform function can be applied to a tile to modify pixels of the tile.

The encoded texture video with the encoded tiles can be delivered to a client device over a network using an existing video delivery infrastructure. For example, the encoded video can be streamed over the Internet using an Internet streaming protocol. Various protocols exist for adaptive bitrate streaming, and any suitable video delivery protocol can be used to deliver the texture videos described herein. One example is Dynamic Adaptive Streaming over HyperText Transfer Protocol (HTTP), or DASH (defined in ISO/IEC 23009-1:2014). Under DASH, a media presentation description (MPD) (e.g., represented in eXtensible Markup Language (XML) file) can include a set of elements that define an adaptation set. The adaptation set can include a set of alternative representations. As noted above, each alternative representation of a tile video can be associated with a particular bit-rate, frame rate, and/or segment size, and can include a set of media segments. Each media segment of a representation can be associated in the MPD with a location (e.g., using a uniform resource location (URL) or other location identifier) of a media segment file that can be downloaded and decoded.

Another example for adaptive bitrate streaming is HTTP Live Streaming (HLS), which provides streaming of file segments associated with the Transport Stream (TS) format. Transport stream specifies a container format encapsulating packetized elementary streams (PES). Each PES comprises an encapsulation of sequential data bytes from a video or audio decoder into PES packets. Using HLS, a server can provide a set of playlist files (also referred to as a description file or a manifest file) to the client device. Each of the playlist files can include links to a sequence of file segments in the TS format and associated with a particular bit-rate. In some cases, a playlist file can be in a .m3u8 format. A variant playlist file can refer to a set of playlist files. Each playlist file can be associated with a set of media segment files for the same texture video, and can be associated with a different bit-rate. The client device can be provided with a variant playlist file and, based on the local conditions (e.g., network bandwidth), can select the playlist file associated with a particular bandwidth, bit-rate, frame rate, etc. The client device may then use the information of the selected playlist file to obtain the media segment files for streaming.

A video decoder can receive an encoded texture video and can decode the video to obtain a decoded sequence of ordered tiles. The decoded sequence of ordered tiles corresponds to the sequence of ordered tiles 410 generated by the sequence generation engine 408. The extent to which the decoded sequence of ordered tiles matches the sequence of ordered tiles 410 depends on the coding efficiency. An illustrative example of a video decoding device 1300 is described with reference to FIG. 13.

Figure 7:
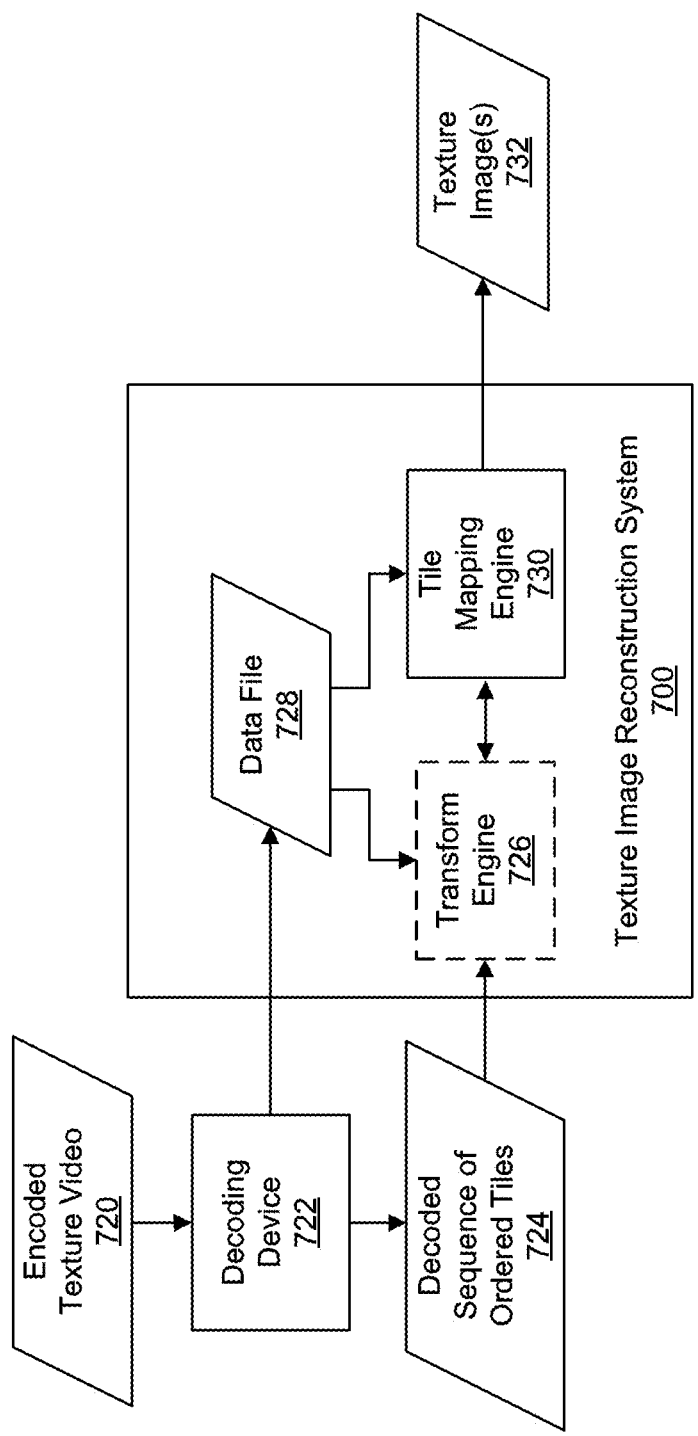
FIG. 7 is a block diagram illustrating an example of a texture image reconstruction system, in accordance with some examples provided herein.

The video decoder can send the decoded sequence to a texture image reconstruction system. FIG. 7 is a block diagram illustrating an example of a texture image reconstruction system 700. The texture image reconstruction system 700 can be included in a client device (e.g., a computing device). For example, the client device can include a personal computer, a tablet computer, a mobile device (e.g., a cellular telephone, a smartphone, a wearable device, or the like), a gaming system or console, a television (e.g., a network-connected television), and/or any other computing device with the resource capabilities to perform the techniques described herein. The texture image reconstruction system 700 has various components, including a transform engine 726 (which is optional, as indicated by the dotted outline shown in FIG. 7) and a tile mapping engine 730. The components of the texture image reconstruction system 700 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the texture image reconstruction system 700 is shown to include certain components, one of ordinary skill will appreciate that the texture image reconstruction system 700 can include more or fewer components than those shown in FIG. 7. For example, the texture image sequencing system 400 may also include, in some instances, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices), one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 7.

As shown in FIG. 7, the encoded texture video 720 from the encoding device 412 is provided to the decoding device 722, which decodes the texture video bitstream to obtain the decoded sequence of ordered tiles 724 corresponding to the sequence of ordered tiles 410 generated by the sequence generation engine 408. The texture image reconstruction system 700 can obtain the data file 728 provided with the encoded texture video. The data file 728 can include contextual data for the tiles of the one or more texture images 402. For example, a configuration file can be included for each tile in the decoded sequence of ordered tiles 724. As noted above, the contextual data (e.g., configuration file) for a tile of a texture image can include a tile identifier, an identification of a texture image associated with the tile, a location of the tile within the texture image, an indication of a transform function, any combination thereof, and/or other contextual information. The table discussed above with respect to FIG. 6 is an example of contextual data (including a transform function) for a tile:

| nameTile | ImageTexture | X_pos | Y_pos | function |
|---|---|---|---|---|
| Left_image | butterfly | 0 | 0 | plain |
| Right_image | butterfly | 150 | 0 | horizontal_mirror |

The texture image reconstruction system 700 can reconstruct the one or more texture images 402 using information from the data file 728. For example, in implementations when a transform engine 726 is included, the transform engine 726 can determine whether a transform function is present in the data file 728 for a given tile. If a transfer function is present for the tile, the transform engine 726 can apply the transform to the tile to modify pixels of the tile. Using the example of FIG. 6 and the above table, the contextual data associated with a tile 604 indicates to the transform engine 726 that a horizontal mirroring function (denoted as "horizontal_mirror") is to be applied on the pixels of the tile 604 ("Right_image") before using the tile 604 to reconstruct the texture image 600. Based on the indication of the transform in the data file, the transform engine 726 can apply the transform to the corresponding tile.

The tile mapping engine 730 can reconstruct the texture images 732 using the information in the data file 728. For a given tile, the tile mapping engine 730 can use the tile identifier, the identification of a texture image associated with the tile, and the location of the tile within the texture image in order to arrange the tile in the correct location relative to the texture image associated with the tile. The tile mapping engine 730 can reconstruct the textures by appropriately stitching the decoded tiles together. For example, a first tile can be mapped to the top-left most position in a first texture image, a second tile can be placed next to the first tile, and so on, based on the data file indicating the tiles belong to the first texture image, and the specific positions of the first, second, etc. tiles in the first texture image. In some cases, the resulting textures images 732 can be a lossy version of the original set of one or more texture images 402, where the loss can depend on the settings of both FPS and bit-rate provided to the encoding device 412.

Figure 8:
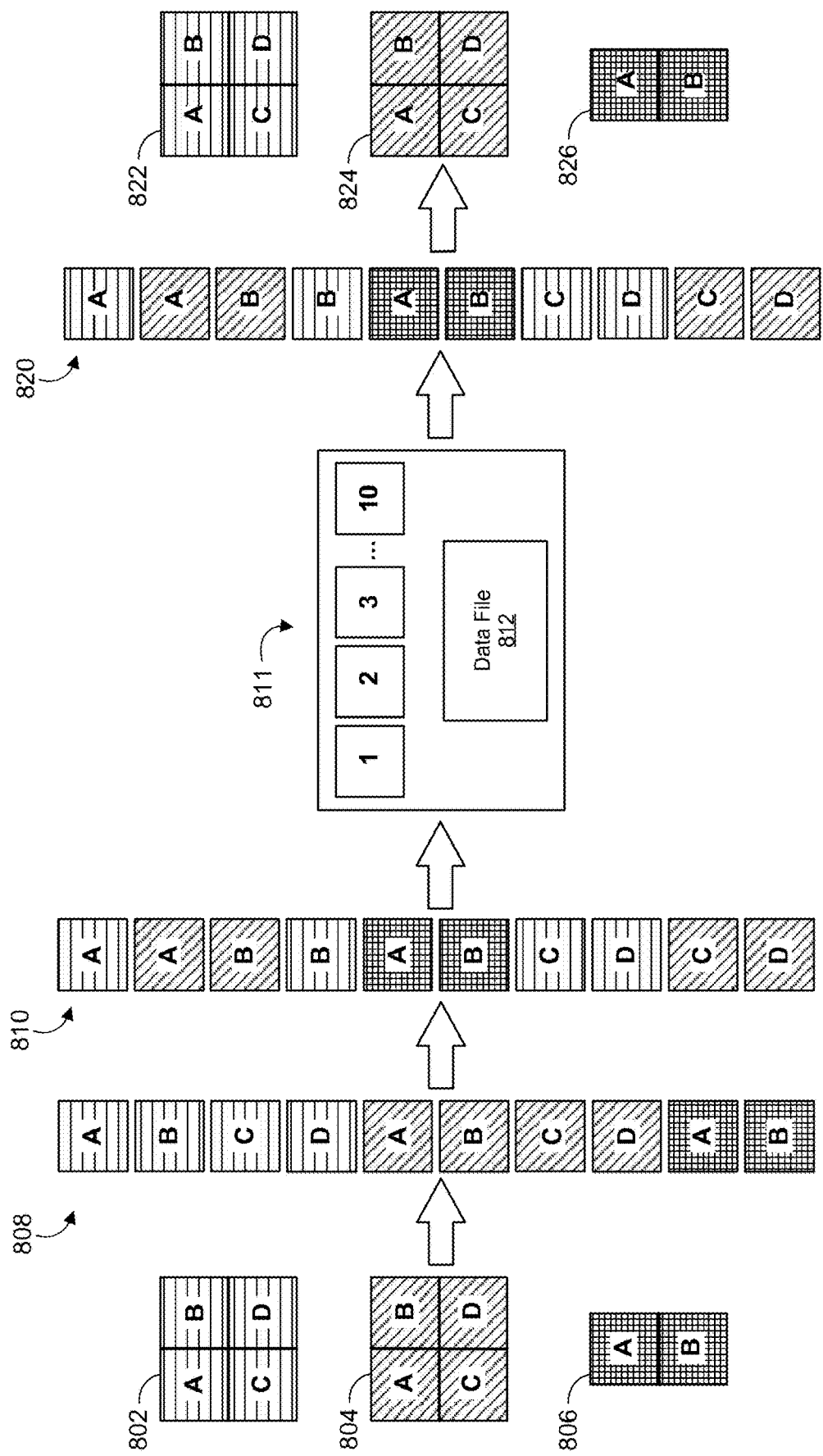
FIG. 8 is a conceptual diagram illustrating an example of the generation, encoding, decoding, and reconstruction of multiple texture images, in accordance with some examples provided herein.

FIG. 8 is a diagram illustrating an example of the generation, encoding, decoding, and reconstruction of multiple texture images using the techniques described herein. As previously described, many textures in a 3D scene can have similarities, such as multiple wood-based textures in a forest scene. A video encoder can exploit similarity between n independent textures to compress them into a video of a certain number of frames (where the frames are the tiles described above) with good rate-distortion trade-off. For example, as shown in FIG. 8, an encoded texture video 811 can be generated from a set of texture images 802, 804, and 806. In one illustrative example, the texture images 802, 804, and 806 can be rendered using a 3D multimedia application by applying the texture images 802, 804, and 806 to one or more 3D meshes of the 3D scene. It is noted that the tiles generated by the tiling engine 404 are referred to as "frames" that will be provided to the encoding device.

As described above, the tiling engine 404 can generate tiles to obtain frame resolution homogenization. The set of textures (including texture images 802, 804, 806) that have to be delivered in order to generate the 3D scene can be denoted as T. As shown, the texture images 802, 804, and 806 in the set T have different resolutions, although the input frames for the encoding device should have the same resolution. The tiling engine 404 can homogenize the input frames by cutting each texture image in T into unit-size tiles. The set of tiles generated from the texture images 802, 804, and 806 can be denoted as T. As shown in FIG. 8, the texture image 802 is divided into four tiles A, B, C, and D, the texture image 804 is divided into four tiles A, B, C, and D, and the texture image 806 is divided into two tiles A and B. The resulting set of tiles 808 can be provided to the sequence generation engine 408.

The sequence generation engine 408 can perform image sequence ordering, as described above. For example, all tiles in T can be sorted based on their similarities (using similarity-based ordering), with respect to sub-sequences (using sub-sequence based ordering), based on random ordering, any suitable combination thereof, and/or other ordering technique. With respect to similarity-based ordering, $d_{i,j}$ can denote the dissimilarity between two independent texture tiled images i and j in T. The lower the $d_{i,j}$, the more similar i and j are to one another. The similarity-based ordering can ensure that consecutive images in the sequence or ordered tiles to be encoded have a high similarity, so that the video encoder can exploit this similarity and efficiently compress the video. In one illustrative example, the theoretical optimal solution of the similarity-based ordering is obtained by computing the minimum traveling salesman problem given the distance matrix $D=\{d_{i,j}, \forall i, j \in T\}$. The solution maximizes the sum of the similarities between consecutive images and includes all texture tiled images. The operation results in a sequence of ordered tiles 810 (denoted as S). As shown in FIG. 8, the tiles from the different texture images 802, 804, and 806 are intermixed within the sequence of ordered tiles. For example, tile A from texture image 802 is next to tile A of texture image 804 due to the tiles having a high degree of similarity. As previously described, other types of ordering techniques can be performed in addition to, or as an alternative to, the similarity-based ordering.

The video encoder takes the sequence of ordered tiles 410 (S) as input (as if S is a set of input video frames or pictures), and compresses the sequence of ordered tiles 410 into an encoded texture video 811 (along with the data file 812 that includes a set of metadata or contextual data that enables the reconstruction of the texture images). As previously described, parameters that a video encoder can require include the number of frames per second (denoted by f) and the target video bit-rate (denoted by v). The tiles have no temporal relation, so the service provider can freely choose any value for f (the higher is f, the more texture tiled images are sent per time unit, and the shorter is the time needed to deliver the whole set of textures). For a given parameter f, the video bit-rate v enables the settings of the quality (the higher v is, the lower the compression and thus the higher the quality of the images). Both parameters f and v allow a service provider to prepare multiple versions of the same set of textures T with multiple qualities and multiple delivery delays. A large number of qualities accommodates the varying client's bandwidth conditions, while multiple delays enables scheduling the delivery of textures based on when the client needs them.

The client device can obtain the texture video 811 and the data file 812. The client device can decode the video of the texture video 811 and can extract a sequence E of video frames (which are the decoded sequence of ordered tiles 820). In some implementations, the decoding operation can be performed by the graphics processing unit (GPU) of the client device. Since efficient video decoders are implemented in many devices that are targeted for 3D applications, the solution described herein respects the universality feature of a texture delivery system. In some cases, as described above, one or more transform functions (e.g., an inverse transform function) can be applied to the one or more of the decoded tiles. A transform function can be identified in the data file 812 for a given tile.

The tile mapping engine 730 can perform texture reconstruction. For example, based on the data file relating the video frames (the tiles) and the original texture images 802, 804, and 806, the client reconstructs the texture images 822, 824, and 826 by appropriately stitching the decoded frames in E. As noted above, the resulting set of textures R can be a lossy version of the original set T, in which case the loss can depend on the settings of both f and v. The texture image 822 is the reconstructed version of the texture image 802, the texture image 824 is the reconstructed version of the texture image 804, and the texture image 826 is the reconstructed version of the texture image 806.

Various benefits are provided using the systems and techniques described herein. For example, the texture image content can be delivered with a predictable or guaranteed time of deliver. Such predictable time of deliver can be important, such as when a content provide sets a time limit (e.g., a 30 second time limit) to deliver all textures of a given scene. Another example benefit of the systems and techniques described herein is that the texture image data can be delivered while adapting to network changes, thus providing adaptivity in view of bandwidth and device limitations. Another example of a benefit is that there is no need to install new software and equipment along the end-to-end delivery chain (e.g., an HTTP server, Content Delivery Network (CDN) infrastructure, end-user client devices, or the like). Furthermore, the systems and techniques described herein provide fast access to a subset of texture images (e.g., by downloading and decoding only certain segments for desired textures).

Moreover, systems and techniques described herein allow texture images to be encoded and delivered as a video sequence, as opposed to being delivered independently as individual texture images or as individual encoded texture images. For example, as previously described, rather than compressing the textures images one by one and delivering the texture images independently, a sequence of textures is generated and compressed using video encoding techniques. Such a solution is advantageous over systems that individually compress each texture image and provide access for each texture to be downloaded independently (e.g., in an image compression library). Systems that individually encode texture images do not allow the leveraging of adaptive streaming for video. These systems do not guarantee timely delivery of the compressed images, and forces client devices to decide on the compression quality of every image without regards to the consequences of the quality choice on the overall download time.

An example of a performance evaluation using the techniques described herein is now described. The performance evaluation was performed using a scene featuring high-quality textures and a large diversity of types of textures. A set of 145 texture images representing 1.13 Gigabytes was extracted. A unit tile size of 1024×1024 was used since the resolution of all the original textures were a multiple of 1024 Similarity-based ordering was used, where the dissimilarity between every pair of texture tiled images was determined using the Mean Absolute Error (MAE). The video compression of the texture sequence was performed using the High Efficiency Video Coding (HEVC) software from the libx265 library. After the video decoding, the Peak Signal to Noise Ratio (PSNR) was computed between the original uncompressed texture images and the reconstructed images. The frames per second f were fixed to 10 FPS, which results in a 56 second long video. The target video bit-rate v ranges from 2.5 Mbps to 50 Mbps.

Figure 11:
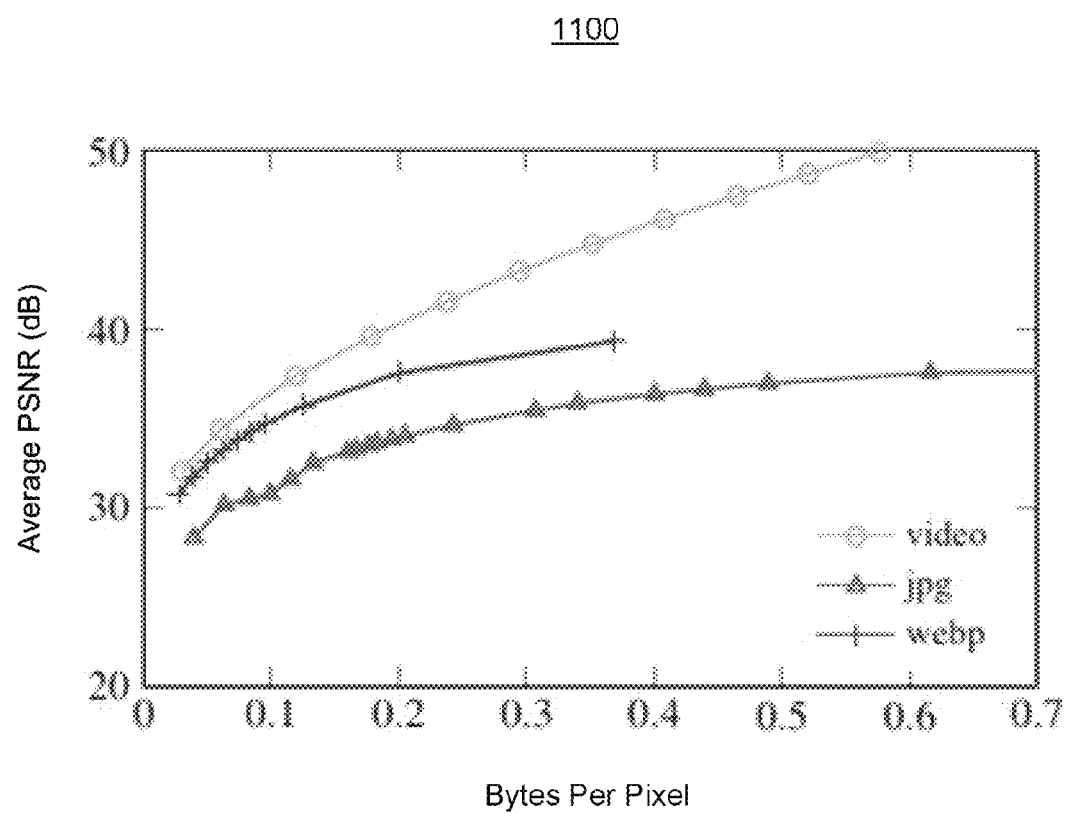
FIG. 11 is a graph illustrating an example of rate-distortion curve based on different coding techniques, in accordance with some examples provided herein.

To compare the performance of the techniques described herein with respect to state-of-the-art techniques, the textures were compressed using both jpeg and webp from the openCV image library. The PSNR and rate were measured for both sets of compressed images. The traditional rate-distortion curve is shown in the graph 1100 illustrated in FIG. 11, where the y-axis is the average PSNR across all textures in R (the reconstructed textures). Even without any additional optimization, the techniques described herein result in better compression performance than the state-of-the-art webp library and significantly outperform jpeg. The video approach is better than webp for low bit-rates (the main objective of webp), and the compression gains grow for higher bit-rates, reaching more than 5 dB for 0.4 bpp. The techniques described herein also offer a wider range of media settings in terms of quality (e.g., from 32 dB to 49 dB) and size (e.g., from 17 MBytes to 328 MBytes), enabling the implementation of adaptive streaming solutions with timely delivery of all textures.

Examples of processes performed using the techniques described herein will now be described. FIG. 9 is a flowchart illustrating an example of a process 900 of generating a video from one or more texture images using one or more of the techniques described herein. The process 900 can obtain a first texture image and process the first texture image. For example, at block 902, the process 900 includes dividing the first texture image into a first plurality of tiles. The first texture image is configured for application to at least a first three-dimensional mesh. For example, the first texture image can include a diffuse texture image, an albedo texture image, a normal texture image, a displacement texture image, an AO texture image, a mask texture image, a roughness texture image, a gloss texture image, or any other type of texture image that can be applied to a three-dimensional mesh to add detailed properties to the mesh.

At block 904, the process 900 includes sorting the first plurality of tiles into a sequence of ordered tiles. In some cases, the first plurality of tiles have a uniform tile size. In some cases, the first plurality of tiles are sorted into the sequence of ordered tiles to maximize compression efficiency. For instance, the first plurality of tiles can be sorted into the sequence of ordered tiles based on similarities (or dissimilarities) among the first plurality of tiles. In one illustrative example, the process 900 can include determining similarities between pairs of tiles from the first plurality of tiles and determining, using the similarities between the pairs of tiles, the sequence of ordered tiles based on the sequence minimizing a sum of dissimilarities between consecutive tiles in the sequence of ordered tiles. In one illustrative example, ordering the tiles into the sequence of ordered tiles can be modeled as a traveling salesman problem. The traveling salesman problem can be solved using solutions, such as dynamic programming, that take into account the similarities (or dissimilarities) between the pairs of tiles in order to determine the sequence of ordered tiles. Other ordering techniques can also be used, such as the Hungarian method, an assignment problem, or the like. In some cases, the first plurality of tiles are sorted into the sequence of ordered tiles in an order that minimizes a number of video segments needed to be downloaded to obtain the first texture image. For example, as described above with respect to FIG. 5D and FIG. 5E, the sequence of ordered tiles can include a first sub-sequence and a second sub-sequence. The first sub-sequence can include a first set of tiles from the first plurality of tiles, and the second sub-sequence can include a second set of tiles from the first plurality of tiles.

At block 906, the process 900 includes providing the sequence of ordered tiles for generation of a coded video. Generation of the coded video includes encoding the first plurality of tiles based on the sequence of ordered tiles.

In some examples, multiple texture images can be processed using the process 900. For example, a second texture image can be obtained. The second texture image can be configured for application to at least one of the first three-dimensional mesh or a second three-dimensional mesh. For example, the second texture image can include a diffuse texture image, an albedo texture image, a normal texture image, a displacement texture image, an AO texture image, a mask texture image, a roughness texture image, a gloss texture image, or any other type of texture image that can be applied to a three-dimensional mesh to add detailed properties to the mesh. The process 900 can include dividing the second texture image into a second plurality of tiles. The sorting performed at block 904 can include sorting the first plurality of tiles and the second plurality of tiles into the sequence of ordered tiles. Generation of the coded video can include encoding the first plurality of tiles and the second plurality of tiles based on the sequence of ordered tiles.

Unlike typical video frames that are encoded by a video encoder, the first texture image and the second texture image are temporally independent, each tile of the first plurality of tiles is temporally independent from other tiles of the first plurality of tiles, and each tile of the second plurality of tiles is temporally independent from other tiles of the second plurality of tiles. In some cases, a first resolution of the first texture image and a second resolution of the second texture image are different resolutions (e.g., similar to the texture images 500A and 500B), and the first plurality of tiles and the second plurality of tiles have a uniform tile size. The uniform tile size can be any suitable size, such as 256×128, 612×256, or other suitable size.

In some examples, the first plurality of tiles are sorted into the sequence of ordered tiles to maximize compression efficiency. For instance, the first plurality of tiles and the second plurality of tiles can be sorted into the sequence of ordered tiles based on similarities (or dissimilarities) among the first plurality of tiles and the second plurality of tiles. In one illustrative example, the process 900 can include determining similarities between pairs of tiles from the first plurality of tiles and the second plurality of tiles, and determining, using the similarities between the pairs of tiles, the sequence of ordered tiles based on the sequence minimizing a sum of dissimilarities between consecutive tiles in the sequence of ordered tiles. As noted above, the ordering of the tiles based on similarities can be modeled as a traveling salesman problem or as an assignment problem, can be performed using the Hungarian method, and/or can be performed based on any other suitable method.

In some implementations, the first plurality of tiles and the second plurality of tiles are sorted into the sequence of ordered tiles in an order that minimizes a number of video segments needed to be downloaded to obtain the first texture image and the second texture image. In some examples, the sequence of ordered tiles includes a first sub-sequence and a second sub-sequence. For example, the first sub-sequence can include a first set of tiles from the first plurality of tiles, and the second sub-sequence can include a second set of tiles from the first plurality of tiles. In some cases, the sequence of ordered tiles includes a third sub-sequence and a fourth sub-sequence. For example, the third sub-sequence can include a first set of tiles from the second plurality of tiles, and the fourth sub-sequence can include a second set of tiles from the second plurality of tiles. Sub-sequences for other texture image tiles can also be determined, as described with respect to FIG. 5D and FIG. 5E.

As described in more detail below with respect to the encoding device 1200 (FIG. 12) and the decoding device 1300 (FIG. 13), the encoded video can be obtained by exploiting similarities between tiles in the sequence of ordered tiles. In some examples, motion compensation (e.g., using inter-prediction) and, in some cases, intra-prediction can be performed to code the tiles. For example, the coded video can be generated based on inter-prediction of a first tile using a second tile as a reference tile for prediction. At least a portion of the reference tile can be identified by generating a motion vector from the first tile to the second tile. For instance, using block-based coding, a motion vector can be from a block of the first tile to a reference block of the second tile. A block can be a macroblock (MB), a coding tree unit (CTU), a coding unit (CU), a prediction unit (PU), or other block-based partition of a frame or picture. In some cases, the motion vector can be from the second tile to the first tile. For instance, using block-based coding, a motion vector can be from a reference block of the second tile to a block of the first tile. In some cases, multiple motion vectors can be generated, with each motion vector pointing to a different reference tile (or block of the reference tile). In some examples, the first tile and the second tile are from the first texture image. In some examples, the first tile is from the first texture image, and the second tile is from the second texture image. In some cases, the first tile of a sub-sequence can be encoded using intra-prediction, while other tiles of a sub-sequence can be encoded using inter-prediction.

In some implementations, a plurality of coded videos are generated for the sequence of ordered tiles. In one example, a first coded video of the plurality of coded videos can have a different bit-rate, a different frame rate, and/or a different segment size (or any combination thereof) than a second coded video of the plurality of coded videos. The two videos can be provided as options to a client device, depending on network conditions and restrictions (e.g., computing and/or memory restrictions) of the client device.

The process 900 can also include transmitting the coded video for decoding by a client device. In some cases, the process 900 can apply a transform function to one or more tiles of the first plurality of tiles. As described above, a transform function can be applied to modify pixels of the one or more tiles (e.g., by mirroring a tile, warping or unwarping a tile, among others). In some examples, modifying the pixels of the one or more tiles using the transform function increases coding efficiency when coding the one or more tiles. For example, modifying the pixels of the one or more tiles using the transform function can increase a similarity between the pixels of the one or more tiles and other pixels of the one or more tiles.

In some examples, the process 900 can include generating a data file including contextual data for the first plurality of tiles. The contextual data for a first tile can include a tile identifier, an identification of a texture image associated with the first tile, a location of the first tile within the texture image, and/or an indication of a transform function, or any combination thereof.

FIG. 10 is a flowchart illustrating an example of a process 1000 of reconstructing one or more texture images from a video using one or more of the techniques described herein. At block 1002, the process 1000 includes obtaining at least a portion of decoded video including a first plurality of tiles sorted into a sequence of ordered tiles. For example, a decoder can obtain an encoded texture video, and can decode the encoded texture video to generate at least the portion of the decoded video. At least the portion of the decoded video can include on or more sub-sequences of the encoded texture video. The first plurality of tiles are associated with a first texture image configured for application to a first three-dimensional mesh. For example, the first texture image can include a diffuse texture image, an albedo texture image, a normal texture image, a displacement texture image, an AO texture image, a mask texture image, a roughness texture image, a gloss texture image, or any other type of texture image that can be applied to a three-dimensional mesh to add detailed properties to the mesh. In some examples, the first plurality of tiles have a uniform tile size. In some cases, the first plurality of tiles are sorted into the sequence of ordered tiles to maximize compression efficiency. For instance, the first plurality of tiles can be sorted into the sequence of ordered tiles based on similarities among the first plurality of tiles.

In some aspects, the first plurality of tiles are sorted into the sequence of ordered tiles in an order that minimizes a number of video segments needed to be downloaded to obtain the first texture image. For example, as described above with respect to FIG. 5D and FIG. 5E, the sequence of ordered tiles can include a first sub-sequence and a second sub-sequence. The first sub-sequence can include a first set of tiles from the first plurality of tiles, and the second sub-sequence can include a second set of tiles from the first plurality of tiles.

In some examples, at least the portion of the decoded video can include tiles associated with multiple texture images. For example, at least the portion of the decoded video can also include a second plurality of tiles. The second plurality of tiles are associated with a second texture image configured for application to at least one of the first three-dimensional mesh or a second three-dimensional mesh. For example, the second texture image can include a diffuse texture image, an albedo texture image, a normal texture image, a displacement texture image, an AO texture image, a mask texture image, a roughness texture image, a gloss texture image, or any other type of texture image that can be applied to a three-dimensional mesh to add detailed properties to the mesh. In some cases, a first resolution of the first texture image and a second resolution of the second texture image are different resolutions, and the first plurality of tiles and the second plurality of tiles have a uniform tile size. Unlike typical videos, the first texture image and the second texture image are temporally independent, each tile of the first plurality of tiles is temporally independent from other tiles of the first plurality of tiles, and each tile of the second plurality of tiles is temporally independent from other tiles of the second plurality of tiles.

In some implementations, the first plurality of tiles and the second plurality of tiles are sorted into the sequence of ordered tiles in an order that minimizes a number of video segments needed to be downloaded to obtain the first texture image and the second texture image. In some examples, the sequence of ordered tiles includes a first sub-sequence and a second sub-sequence. For example, the first sub-sequence can include a first set of tiles from the first plurality of tiles, and the second sub-sequence can include a second set of tiles from the first plurality of tiles. In some cases, the sequence of ordered tiles includes a third sub-sequence and a fourth sub-sequence. For example, the third sub-sequence can include a first set of tiles from the second plurality of tiles, and the fourth sub-sequence can include a second set of tiles from the second plurality of tiles. Sub-sequences for other texture image tiles can also be determined, as described with respect to FIG. 5D and FIG. 5E.

As described in more detail below with respect to the encoding device 1200 (FIG. 12) and the decoding device 1300 (FIG. 13), the decoded video can be obtained by exploiting similarities between tiles in the sequence of ordered tiles. In some examples, motion compensation (e.g., using inter-prediction) and, in some cases, intra-prediction can be performed to code the tiles. For example, at least the portion of decoded video can be generated based on inter-prediction of a first tile using a second tile as a reference tile. At least a portion of the reference tile can be identified using a motion vector from the first tile to the second tile. For instance, using block-based coding, a motion vector can be from a block of the first tile to a reference block of the second tile. In some cases, the motion vector can be from the second tile to the first tile. For instance, using block-based coding, a motion vector can be from a reference block of the second tile to a block of the first tile. In some cases, multiple motion vectors can be generated, with each motion vector pointing to a different reference tile (or block of the reference tile). In some cases, the first tile and the second tile are from the first texture image. In some cases, the first tile is from the first texture image, and the second tile is from a second texture image.

In some aspects, a plurality of coded videos (e.g., representations, as described above) are generated for the sequence of ordered tiles. In one example, a first coded video of the plurality of coded videos can have a different bit-rate, a different frame rate, and/or a different segment size (or any combination thereof) than a second coded video of the plurality of coded videos. The process 1000 can select one of the videos as an option for download and decoding, based on network conditions and restrictions (e.g., computing and/or memory restrictions) of the client device. For example, the process 1000 can include receiving, over a network, at least one of a portion of the first coded video or a portion of the second coded video based on at least one or more network conditions associated with the network. The first coded video can be selected based on at least the one or more network conditions associated with the network. In some cases, at least one of the portion of the first coded video or the portion of the second coded video is received further based on physical resources of a client device, based on an application of the client device, a combination thereof, or based on other factors. For example, the first coded video can be selected further based on the physical resources of a client device and an application of the client device (e.g., a gaming application, a movie application, or the like).

At block 1004, the process 1000 includes obtaining a data file associated with at least the portion of the decoded video. The data file includes contextual data mapping the first plurality of tiles to the first texture image. For example, the contextual data for a tile of the first plurality of tiles can include a tile identifier, an identification of a texture image associated with the tile, a location of the tile within the texture image, and/or an indication of a transform function, or any combination thereof. The transform function is configured to modify pixels of one or more tiles of the first plurality of tiles. For instance, the process 1000 can include applying the inverse transform function to the pixels of the tile of the first plurality of tiles. The inverse transform function can include an inverse of the transform function indicated in the data file for the tile.

At block 1006, the process 1000 includes reconstructing the first texture image based on the contextual data mapping the first plurality of tiles to the first texture image. For example, the first texture image can be reconstructed by stitching the decoded tiles together according to the mapping provided by the data file.

Figure 14:
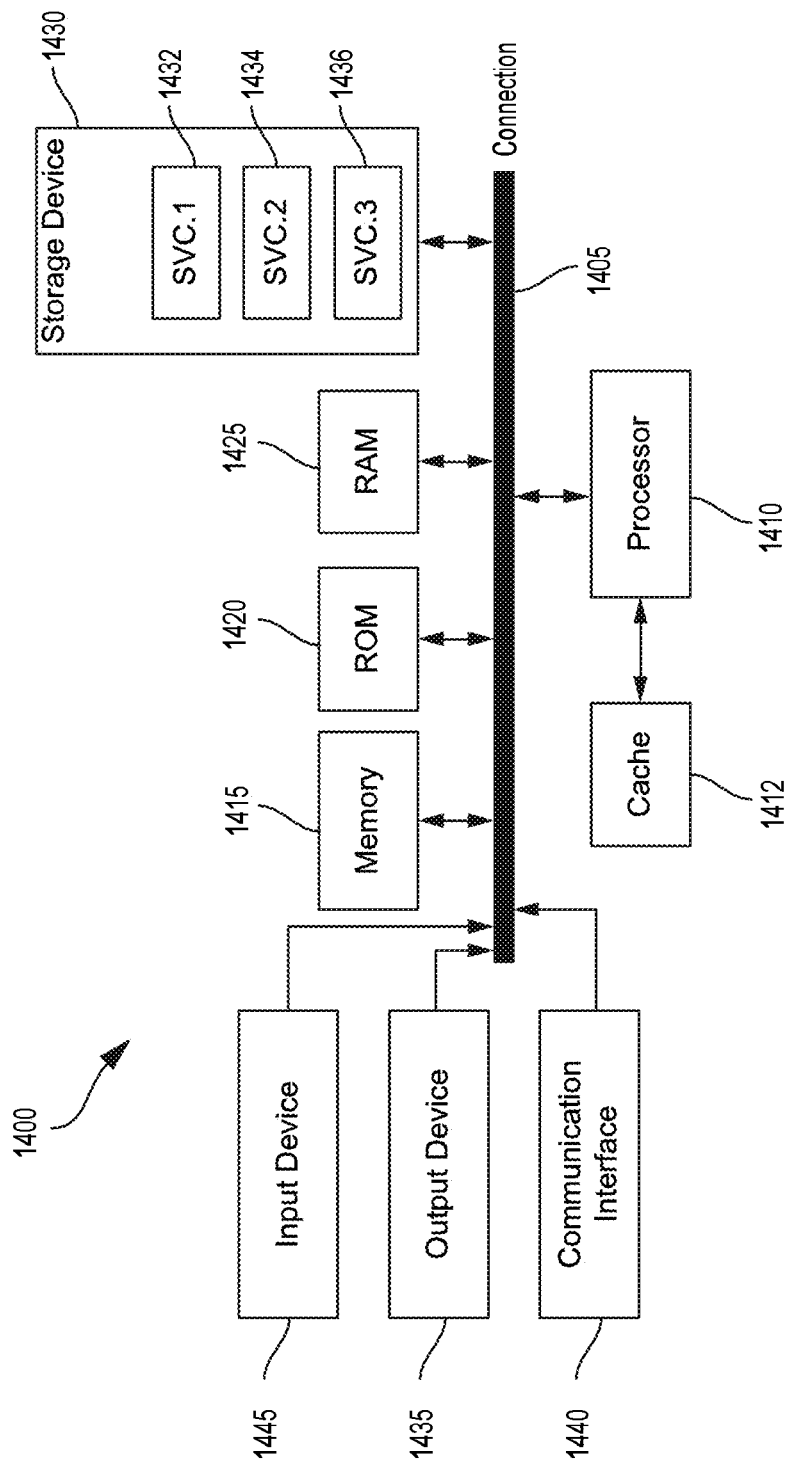
FIG. 14 is an example computing device architecture of an example computing device that can implement the various techniques described herein.

In some examples, the processes 900 and 1000 may be performed by a computing device or apparatus, such as a computing device having the computing device architecture 1400 shown in FIG. 14. In one example, the process 900 can be performed by a computing device with the computing device architecture 1400 implementing the texture image sequencing system 400. In another example, the process 1000 can be performed by a computing device with the computing device architecture 1400 implementing the texture image reconstruction system 700. The computing device for performing the process 900 and/or the process 1000 can include any suitable device, such as a personal computer, a tablet computer, a mobile device (e.g., a cellular telephone, a smartphone, a wearable device, or the like), a gaming system or console, a television (e.g., a network-connected television), a server, and/or any other computing device with the resource capabilities to perform the process 1500. In some cases, the computing device or apparatus may include various components, such as one or more input devices, one or more processors, one or more microprocessors, one or more microcomputers, one or more output devices, and/or other component that is configured to carry out the steps of processes 900 and 1000. The computing device may further include a network interface configured to communicate and/or receive the data. The network interface may be configured to communicate and/or receive Internet Protocol (IP) based data or other type of data. In some examples, the computing device or apparatus may include a display for displaying 3D content or other suitable content.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Processes 900 and 1000 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 900 and 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
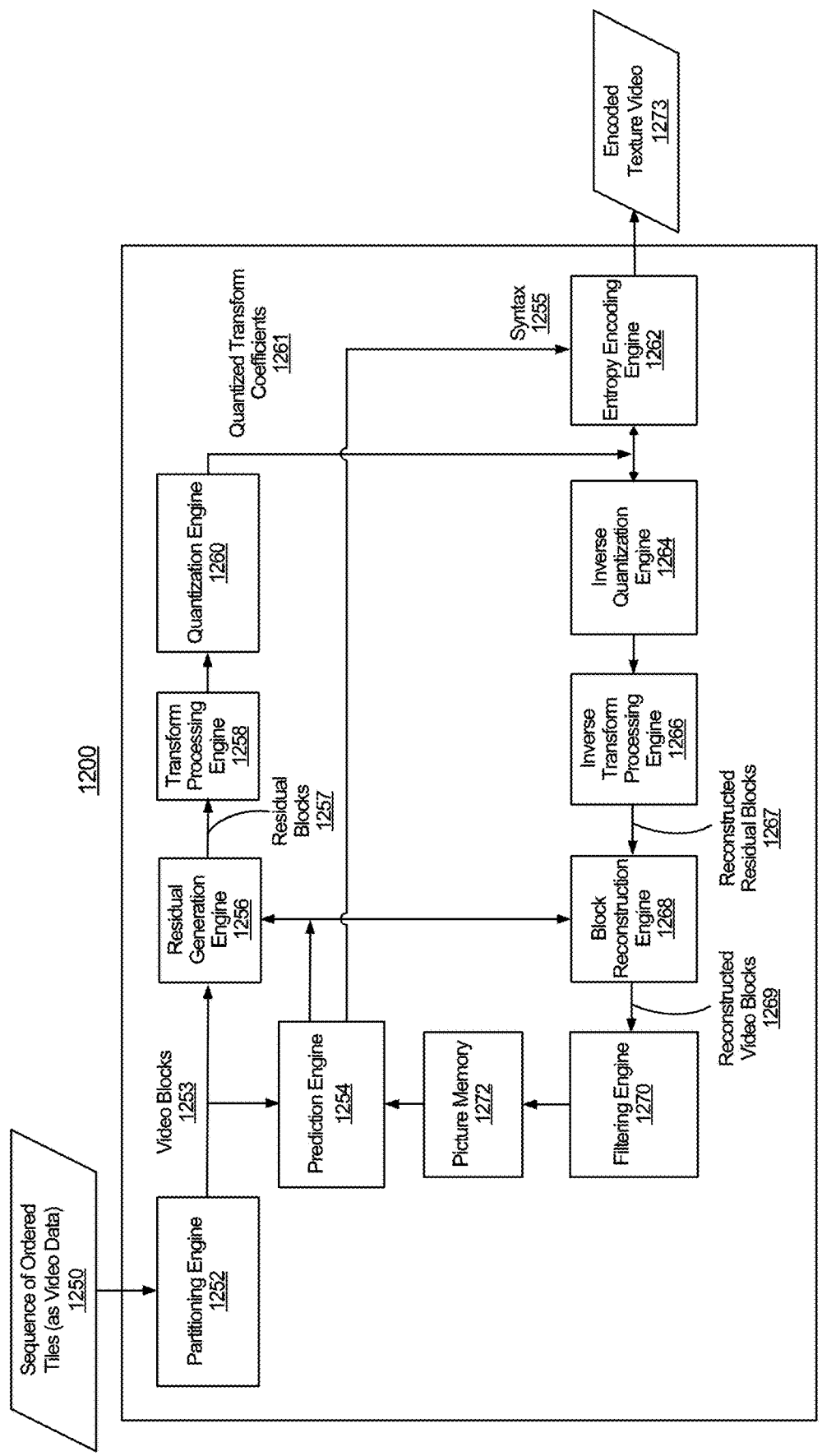
FIG. 12 is a block diagram illustrating an example video encoding device, in accordance with some examples provided herein.

FIG. 12 is a block diagram illustrating an example encoding device 1200 that may be used to encode the sequence of ordered tiles 1250 into an encoded texture video 1273. The encoding device 1200 can encode the sequence of ordered tiles just like any other video frames. For example, the encoding device 1200 may perform intra-prediction and motion compensation (e.g., using inter-prediction) coding of video blocks 1253 within video slices. The video blocks 1253 and video slices are generated from the sequence of ordered tiles provided to the encoding device 1200. In some cases, intra-prediction is performed for a first tile of a sub-sequence and motion compensation (e.g., using inter-prediction) can be performed for all other tiles of the sub-sequence. Intra-prediction relies, at least in part, on spatial prediction to reduce or remove spatial redundancy within a given video frame or picture. Inter-prediction relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes. The example encoding and decoding processes performed by the encoding device 1200 and the decoding device 1300 are based on High Efficiency Video Coding (HEVC) for illustrative purposes only. One of ordinary skill will appreciate that the encoding and decoding techniques applied to the sequence of ordered tiles can be based on any type of video coding. Other illustrative examples of video coding techniques can be based on ITU-T H.261 (ISO/IEC MPEG-1 Visual), ITU-T H.262 (ISO/IEC MPEG-2 Visual), ITU-T H.263 (ISO/IEC MPEG-4 Visual), ITU-T H.264 (ISO/IEC MPEG-4 AVC), including the Scalable Video Coding (SVC) and Multiview Video Coding (MVC) extensions of AVC, Versatile Video Coding (VVC), and/or other video coding standard in development or to be developed.

The encoding device 1200 includes a partitioning engine 1252, prediction processing engine 1254, filtering engine 1270, picture memory 1272, a residual generation engine 1256, transform processing engine 1258, quantization engine 1260, and entropy encoding engine 1262. Prediction processing engine 1254 can include a motion estimation engine, a motion compensation engine, and an intra-prediction processing engine. For video block reconstruction, encoding device 1200 also includes inverse quantization engine 1264, inverse transform processing engine 1266, and block reconstruction engine 1268. Filtering engine 1270 can represent one or more loop filters.

As shown in FIG. 12, the encoding device 1200 receives a sequence of ordered tiles (as video data), and the partitioning engine 1252 partitions the data into video blocks 1253. The partitioning may also include partitioning into slices, slice segments, tiles, or other larger engines, as wells as video block partitioning (e.g., according to a quadtree structure of LCUs and CUs). The encoding device 1200 generally illustrates the components that encode video blocks 1253 within a video slice to be encoded. A slice may be divided into multiple video blocks 1253. Prediction processing engine 1254 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing engine 1254 may provide the resulting intra- or inter-coded block to residual generation engine 1256 to generate residual blocks 1257 (including residual block data) and to block reconstruction engine 1268 to reconstruct the encoded block for use as a reference picture.

Intra-prediction processing engine within prediction processing engine 1254 may perform intra-prediction coding of the current video block relative to one or more neighboring blocks in the same frame or slice as the current block to be coded to provide spatial compression. Motion estimation engine and motion compensation engine within prediction processing engine 1254 perform inter-predictive coding of the current video block relative to one or more predictive blocks in one or more reference pictures to provide temporal compression. In some cases, intra-prediction is performed for a first tile of a sub-sequence and inter-prediction can be performed for all other tiles of the sub-sequence. For example, an encoded video bitstream can be a series of one or more coded video sequences, where a coded video sequence (CVS) includes a series of access units (AUs) starting with an AU that has a random access point (RAP) picture in the base layer and with certain properties up to and not including a next AU that has a random access point picture in the base layer and with certain properties. An access unit (AU) includes one or more coded pictures and control information corresponding to the coded pictures that share the same output time. Coded slices of pictures are encapsulated in the bitstream level into data units called network abstraction layer (NAL) units. A CVS and a sub-bitstream can be used analogously herein, both referring to an independently downloadable and decodable portion of the video bitstream.

Motion estimation engine may be configured to determine the inter-prediction mode for a video slice according to a predetermined pattern for a video sequence. The predetermined pattern may designate video slices in the sequence as P slices, B slices, or GPB slices. Motion estimation engine and motion compensation engine may be highly integrated, but are illustrated separately for conceptual purposes. Motion estimation, performed by motion estimation engine, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 1200 may calculate values for sub-integer pixel positions of reference pictures stored in picture memory 1272. For example, the encoding device 1200 may interpolate values of one-quarter pixel positions, one-eighth pixel positions, or other fractional pixel positions of the reference picture. Therefore, motion estimation engine may perform a motion search relative to the full pixel positions and fractional pixel positions and output a motion vector with fractional pixel precision.

The motion estimation engine can calculate a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 1272. Motion estimation engine sends the calculated motion vector to entropy encoding engine 1262 and motion compensation engine.

Motion compensation, performed by motion compensation engine, may involve fetching or generating the predictive block based on the motion vector determined by motion estimation, possibly performing interpolations to sub-pixel precision. Upon receiving the motion vector for the PU of the current video block, motion compensation engine may locate the predictive block to which the motion vector points in a reference picture list. The encoding device 1200 forms a residual block 1257 by subtracting pixel values of the predictive block from the pixel values of the current video block being coded, forming pixel difference values. The pixel difference values form residual data for the block, and may include both luma and chroma difference components. Residual generation engine 1256 represents the component or components that perform this subtraction operation to generate residual blocks 1257. Motion compensation engine may also generate syntax elements included in the syntax 1255. The syntax elements are associated with the video blocks and the video slice, and can be used by the decoding device 1300 in decoding the video blocks of the video slice.

Intra-prediction processing engine may intra-predict a current block, as an alternative to the inter-prediction performed by motion estimation engine and motion compensation engine, as described above. In particular, intra-prediction processing engine may determine an intra-prediction mode to use to encode a current block. In some examples, intra-prediction processing engine may encode a current block using various intra-prediction modes (e.g., during separate encoding passes), and intra-prediction engine processing may select an appropriate intra-prediction mode to use from the tested modes. For example, intra-prediction processing engine may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit-rate (that is, a number of bits) used to produce the encoded block. Intra-prediction processing engine may calculate ratios from the distortions and rates for the various encoded blocks to determine which intra-prediction mode exhibits the best rate-distortion value for the block.

In any case, after selecting an intra-prediction mode for a block, intra-prediction processing engine may provide information indicative of the selected intra-prediction mode for the block to entropy encoding engine 1262. Entropy encoding engine 1262 may encode the information indicating the selected intra-prediction mode. The encoding device 1200 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables.

After prediction processing engine 1254 generates the predictive block for the current video block via either inter-prediction or intra-prediction, the encoding device 1200 forms a residual video block by subtracting the predictive block from the current video block. The residual video data in the residual block may be included in one or more transform units (TUs) and applied to transform processing engine 1258. Transform processing engine 1258 transforms the residual video data into residual transform coefficients using a transform, such as a discrete cosine transform (DCT) or a conceptually similar transform. Transform processing engine 1258 may convert the residual video data from a pixel domain to a transform domain, such as a frequency domain.

Transform processing engine 1258 may send the resulting transform coefficients to the quantization engine 1260. The quantization engine 1260 quantizes the transform coefficients to further reduce bitrate. The output of the quantization engine 1260 includes quantized transform coefficients 1261. The quantization process may reduce the bit depth associated with some or all of the coefficients. The degree of quantization may be modified by adjusting a quantization parameter. In some examples, the quantization engine 1260 (or in some cases the entropy encoding engine 1262) may then perform a scan of the matrix including the quantized transform coefficients 1261.

Following quantization, the entropy encoding engine 1262 entropy encodes the quantized transform coefficients 1261. For example, the entropy encoding engine 1262 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy encoding technique. The entropy encoding engine 1262 may also entropy encode the motion vectors and the other syntax elements for the current video slice being coded. Following the entropy encoding by the entropy encoding engine 1262, the encoded bitstream may be transmitted to the decoding device 1300, or stored for later transmission or retrieval by the decoding device 1300.

The inverse quantization engine 1264 and the inverse transform processing engine 1266 can apply inverse quantization and inverse transformation, respectively, to reconstruct residual blocks (referred to as reconstructed residual blocks 1267) in the pixel domain for later use as a reference block of a reference picture. The motion compensation engine may calculate a reference block by adding the residual block to a predictive block of one of the reference pictures within a reference picture list. The motion compensation engine may also apply one or more interpolation filters to the reconstructed residual block to calculate sub-integer pixel values for use in motion estimation. The block reconstruction engine 1268 adds the reconstructed residual block to the motion compensated prediction block produced by motion compensation engine to produce a reconstructed video block. Multiple reconstructed video blocks 1269 are generated by the block reconstruction engine 1268. The reconstructed video block can be used as a reference block for storage in the picture memory 1272. The reference block may be used by motion estimation engine and motion compensation engine as a reference block to inter-predict a block in a subsequent video frame or picture.

In this manner, the encoding device 1200 of FIG. 12 represents an example of a video encoder configured to perform at least a part of the one or more of the processes described herein. For instance, the encoding device 1200 may perform any of the techniques described herein, including parts of the processes described above with respect to FIG. 9 and FIG. 10.

Figure 13:
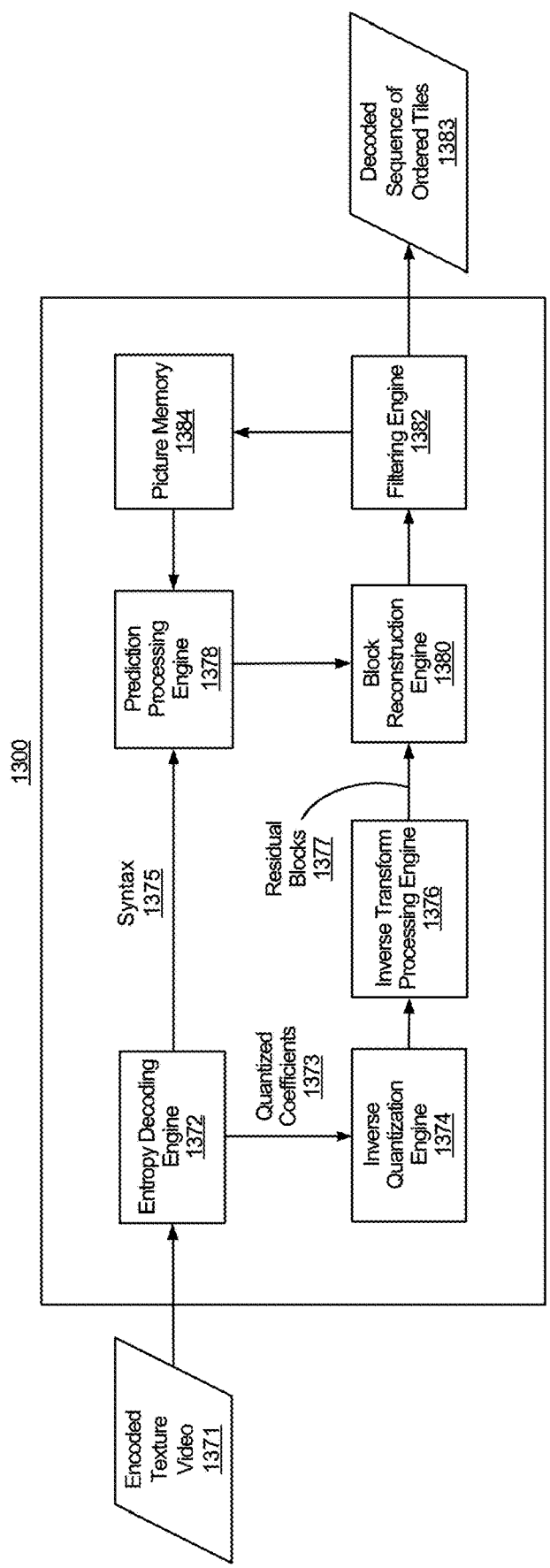
FIG. 13 is a block diagram illustrating an example video decoding device, in accordance with some examples provided herein.

FIG. 13 is a block diagram illustrating an example of a decoding device 1300. The decoding device 1300 includes an entropy decoding engine 1372, prediction processing engine 1378, inverse quantization engine 1374, inverse transform processing engine 1376, block reconstruction engine 1380, filtering engine 1382, and picture memory 1384. The prediction processing engine 1378 can include a motion compensation engine and an intra-prediction processing engine. The decoding device 1300 may, in some examples, perform a decoding pass generally reciprocal to the encoding pass described with respect to the encoding device 1200 from FIG. 12.

During the decoding process, the decoding device 1300 receives an encoded texture video 1371 that includes the encoded sequence of ordered tiles. The encoded texture video 1371 includes video blocks of an encoded video slice and associated syntax elements (in syntax 1255) sent by the encoding device 1200. In some examples, the decoding device 1300 may receive the encoded texture video 1371 from the encoding device 1200. In some examples, the decoding device 1300 may receive the encoded texture video 1371 from a network entity, such as a server, or other such device.

The entropy decoding engine 1372 of the decoding device 1300 entropy decodes the bitstream to generate quantized coefficients 1373, motion vectors, and other syntax elements (included in syntax 1375). The entropy decoding engine 1372 forwards the motion vectors and other syntax elements to the prediction processing engine 1378. The decoding device 1300 may receive the syntax elements at the video slice level and/or the video block level. The entropy decoding engine 1372 may process and parse both fixed-length syntax elements and variable-length syntax elements in or more parameter sets.

When the video slice is coded as an intra-coded (I) slice, the intra-prediction processing engine of prediction processing engine 1378 may generate prediction data for a video block of the current video slice based on a signaled intra-prediction mode and data from previously decoded blocks of the current frame or picture. When the video frame is coded as an inter-coded (e.g., B, P or GPB) slice, the motion compensation engine of the prediction processing engine 1378 produces predictive blocks for a video block of the current video slice based on the motion vectors and other syntax elements received from entropy decoding engine 1372. The predictive blocks may be produced from one of the reference pictures within a reference picture list. The decoding device 1300 may construct the reference frame lists, List 0 and List 1, using default construction techniques based on reference pictures stored in picture memory 1384.

The motion compensation engine determines prediction information for a video block of the current video slice by parsing the motion vectors and other syntax elements, and uses the prediction information to produce the predictive blocks for the current video block being decoded. For example, motion compensation engine may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation engine may also perform interpolation based on one or more interpolation filters. The motion compensation engine may use interpolation filters as used by the encoding device 1200 during encoding of the video blocks to calculate interpolated values for sub-integer pixels of reference blocks. In some cases, motion compensation engine may determine the interpolation filters used by the encoding device 1200 from the received syntax elements, and may use the interpolation filters to produce predictive blocks.

The inverse quantization engine 1374 inverse quantizes (also referred to as de-quantizing), the quantized transform coefficients provided in the bitstream and decoded by entropy decoding engine 1372. The inverse quantization process may include use of a quantization parameter calculated by the encoding device 1200 for each video block in the video slice to determine a degree of quantization and, likewise, a degree of inverse quantization that should be applied. Inverse transform processing engine 1376 applies an inverse transform (e.g., an inverse DCT or other suitable inverse transform), an inverse integer transform, or a conceptually similar inverse transform process, to the transform coefficients in order to produce residual blocks 1377 in the pixel domain.

After the motion compensation engine generates the predictive block for the current video block based on the motion vectors and other syntax elements, the decoding device 1300 forms a decoded video block by summing the residual blocks from inverse transform processing engine 1376 with the corresponding predictive blocks generated by motion compensation engine. Block reconstruction engine 1380 represents the component or components that perform this summation operation. If desired, loop filters (either in the coding loop or after the coding loop) may also be used to smooth pixel transitions, or to otherwise improve the video quality. Filtering engine 1382 is intended to represent one or more loop filters. Although filtering engine 1382 is shown in FIG. 13 as being an in loop filter, in other configurations, filtering engine 1382 may be implemented as a post loop filter. The decoded video blocks make up decoded tiles that represent the decoded sequence of ordered tiles 1383. The decoded video blocks in a given frame or picture are then stored in picture memory 1384, which stores reference pictures used for subsequent motion compensation. Picture memory 1384 also stores decoded video for later presentation on a display device.

In this manner, the decoding device 1300 of FIG. 13 represents an example of a video decoder configured to perform one or more of the processes described above. For instance, the decoding device 1300 may perform any of the techniques described herein, including part of the processes described above with respect to FIG. 9 and FIG. 10.

FIG. 14 illustrates an example computing device architecture 1400 of an example computing device which can implement the various techniques described herein. For example, the computing device architecture 1400 can implement the texture image sequencing system 400 shown in FIG. 4. In another example, the computing device architecture 1400 can implement the texture image reconstruction system 700 shown in FIG. 7. The components of computing device architecture 1400 are shown in electrical communication with each other using connection 1405, such as a bus.

The example computing device architecture 1400 includes a processing unit (CPU or processor) 1410 and computing device connection 1405 that couples various computing device components including computing device memory 1415, such as read only memory (ROM) 1420 and random access memory (RAM) 1425, to processor 1410.

Computing device architecture 1400 can include a cache of high-speed memory connected directly with, in close proximity to, or integrated as part of processor 1410. Computing device architecture 1400 can copy data from memory 1415 and/or the storage device 1430 to cache 1412 for quick access by processor 1410. In this way, the cache can provide a performance boost that avoids processor 1410 delays while waiting for data. These and other modules can control or be configured to control processor 1410 to perform various actions. Other computing device memory 1415 may be available for use as well. Memory 1415 can include multiple different types of memory with different performance characteristics. Processor 1410 can include any general purpose processor and a hardware or software service, such as service 1 1432, service 2 1434, and service 3 1436 stored in storage device 1430, configured to control processor 1410 as well as a special-purpose processor where software instructions are incorporated into the processor design. Processor 1410 may be a self-contained system, containing multiple cores or processors, a bus, memory controller, cache, etc. A multi-core processor may be symmetric or asymmetric.

To enable user interaction with the computing device architecture 1400, input device 1445 can represent any number of input mechanisms, such as a microphone for speech, a touch-sensitive screen for gesture or graphical input, keyboard, mouse, motion input, speech and so forth. Output device 1435 can also be one or more of a number of output mechanisms known to those of skill in the art, such as a display, projector, television, speaker device, etc. In some instances, multimodal computing devices can enable a user to provide multiple types of input to communicate with computing device architecture 1400. Communications interface 1440 can generally govern and manage the user input and computing device output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1425, read only memory (ROM) 1420, and hybrids thereof. Storage device 1430 can include services 1432, 1434, 1436 for controlling processor 1410. Other hardware or software modules are contemplated. Storage device 1430 can be connected to the computing device connection 1405. In one aspect, a hardware module that performs a particular function can include the software component stored in a computer-readable medium in connection with the necessary hardware components, such as processor 1410, connection 1405, output device 1435, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods and processes according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (referred to as a codec).

What is claimed is:

1. A method of generating a video from one or more texture images, comprising:
    receiving a request for a plurality of texture images associated with at least a first three-dimensional mesh of a three-dimensional scene, wherein the plurality of texture images are temporally independent;
    dividing a first texture image into a first plurality of tiles;
    dividing a second texture image into a second plurality of tiles:
    sorting the first plurality of tiles and second plurality of tiles into a sequence of ordered tiles;
    generating a plurality of coded videos based at least on the sequence of ordered tiles, each coded video having a different frame per second; and
    providing a first coded video from the plurality of coded videos, the first coded video selected based at least on a current network condition or a receiving client device.

2. The method of claim 1, further comprising:
    determining similarities between pairs of tiles from the first plurality of tiles; and
    determining, using the similarities between the pairs of tiles, the sequence of ordered tiles based on the sequence minimizing a sum of dissimilarities between consecutive tiles in the sequence of ordered tiles.

3. The method of claim 1, wherein the first plurality of tiles are sorted into the sequence of ordered tiles in an order that minimizes a number of video segments needed to be downloaded to obtain the first texture image.

4. The method of claim 3, wherein the sequence of ordered tiles includes a first sub-sequence and a second sub-sequence, the first sub-sequence including a first set of tiles from the first plurality of tiles and the second sub-sequence including a second set of tiles from the first plurality of tiles.

5. The method of claim 1, further comprising:
    dividing a second texture image into a second plurality of tiles, the second texture image being configured for application to at least one of the first three-dimensional mesh or a second three-dimensional mesh;
    wherein the sorting includes sorting the first plurality of tiles and the second plurality of tiles into the sequence of ordered tiles; and
    wherein generation of the coded video includes encoding the first plurality of tiles and the second plurality of tiles based on the sequence of ordered tiles.

6. The method of claim 5, wherein the first texture image and the second texture image are temporally independent, wherein a first resolution of the first texture image and a second resolution of the second texture image are different resolutions, and wherein the first plurality of tiles and the second plurality of tiles have a uniform tile size.

7. The method of claim 5, wherein the first plurality of tiles and the second plurality of tiles are sorted into the sequence of ordered tiles based on similarities among the first plurality of tiles and the second plurality of tiles.

8. The method of claim 5, further comprising:
    determining similarities between pairs of tiles from the first plurality of tiles and the second plurality of tiles; and
    determining, using the similarities between the pairs of tiles, the sequence of ordered tiles based on the sequence minimizing a sum of dissimilarities between consecutive tiles in the sequence of ordered tiles.

9. The method of claim 5, wherein the first plurality of tiles and the second plurality of tiles are sorted into the sequence of ordered tiles in an order that minimizes a number of video segments needed to be downloaded to obtain the first texture image and the second texture image.

10. The method of claim 1, wherein the coded video is generated based on inter-prediction of a first tile using a second tile as a reference tile for prediction.

11. The method of claim 10, wherein the first tile and the second tile are from the first texture image.

12. The method of claim 10, wherein the first tile is from the first texture image, and wherein the second tile is from a second texture image.

13. The method of claim 1, wherein a plurality of coded videos are generated for the sequence of ordered tiles, a first coded video of the plurality of coded videos having at least one of a different bit-rate, a different frame rate, or a different segment size than a second coded video of the plurality of coded videos.

14. An apparatus for generating a video from one or more texture images, the apparatus comprising:
    a memory configured to store the one or more texture images; and a processor implemented in circuitry and configured to:
    receive a request for a plurality of texture images associated with at least a first three-dimensional mesh of a three-dimensional scene, wherein the plurality of texture images are temporally independent;
    divide a first texture image into a first plurality of tiles;
    divide a second texture image into a second plurality of tiles:
    sort the first plurality of tiles and second plurality of tiles into a sequence of ordered tiles;
    generate a plurality of coded videos based at least on the sequence of ordered tiles, each coded video having a different frame per second; and
    provide a first coded video from the plurality of coded videos, the first coded video selected based at least on a current network condition or a receiving client device.

15. The apparatus of claim 14, wherein the processor is further configured to:
  determine similarities between pairs of tiles from the first plurality of tiles; and
  determine, using the similarities between the pairs of tiles, the sequence of ordered tiles based on the sequence minimizing a sum of dissimilarities between consecutive tiles in the sequence of ordered tiles.

16. The apparatus of claim 14, wherein the sequence of ordered tiles includes a first sub-sequence and a second sub-sequence, the first sub-sequence including a first set of tiles from the first plurality of tiles and the second sub-sequence including a second set of tiles from the first plurality of tiles.

17. The apparatus of claim 14, wherein the processor is further configured to:
  divide a second texture image into a second plurality of tiles, the second texture image being configured for application to at least one of the first three-dimensional mesh or a second three-dimensional mesh;
  wherein the sorting includes sorting the first plurality of tiles and the second plurality of tiles into the sequence of ordered tiles; and
  wherein generation of the coded video includes encoding the first plurality of tiles and the second plurality of tiles based on the sequence of ordered tiles.

18. The apparatus of claim 17, wherein the first texture image and the second texture image are temporally independent, wherein a first resolution of the first texture image and a second resolution of the second texture image are different resolutions, and wherein the first plurality of tiles and the second plurality of tiles have a uniform tile size.

19. The apparatus of claim 17, wherein the processor is further configured to:
  determine similarities between pairs of tiles from the first plurality of tiles and the second plurality of tiles; and
  determine, using the similarities between the pairs of tiles, the sequence of ordered tiles based on the sequence minimizing a sum of dissimilarities between consecutive tiles in the sequence of ordered tiles.

20. A non-transitory computer-readable medium is provided having stored thereon instructions that, when executed by one or more processors, cause the one or more processor to:
  receive a request for a plurality of texture images associated with at least a first three-dimensional mesh of a three-dimensional scene, wherein the plurality of texture images are temporally independent;
  divide a first texture image into a first plurality of tiles;
  divide a second texture image into a second plurality of tiles:
  sort the first plurality of tiles and second plurality of tiles into a sequence of ordered tiles;
  generate a plurality of coded videos based at least on the sequence of ordered tiles, each coded video having a different frame per second; and
  provide a first coded video from the plurality of coded videos, the first coded video selected based at least on a current network condition or a receiving client device.

* * * * *